United States Patent [19]
Pommerening

[11] 3,936,615
[45] Feb. 3, 1976

[54] TRUNK TRANSFER CIRCUIT

[75] Inventor: Uwe A. Pommerening, Webster, N.Y.

[73] Assignee: Stromberg-Carlson Corporation, Rochester, N.Y.

[22] Filed: Mar. 25, 1975

[21] Appl. No.: 561,744

[52] U.S. Cl. .......................... 179/18 AD; 179/27 CA
[51] Int. Cl.[2] ........................................... H04M 3/58
[58] Field of Search ...... 179/18 AD, 18 EA, 18 GF, 179/18 ES, 18 AB, 18 FF, 18 AH, 18 AG, 18 BD, 18 BE, 18 C, 27 CA, 99

[56] References Cited
UNITED STATES PATENTS

| | | | |
|---|---|---|---|
| 3,221,108 | 11/1965 | Seemann et al. | 179/27 CA |
| 3,513,263 | 5/1970 | Bastian et al. | 179/18 AD |
| 3,769,462 | 10/1973 | Russell et al. | 179/18 AD |
| 3,786,194 | 1/1974 | Pinede et al. | 179/18 AD |
| 3,843,845 | 10/1974 | Ridley | 179/99 |

*Primary Examiner*—Thomas A. Robinson
*Attorney, Agent, or Firm*—William F. Porter, Jr.; William A. Marvin

[57] ABSTRACT

A circuit is disclosed for providing trunk transfer in an electronic private automatic branch exchange which is built around a space divided solid state matrix. The trunk transfer circuit is enabled by a hookswitch flash from a transferring PABX station connected to an established incoming or outgoing trunk call and directs the trunk junctor associated with that call to place the connected trunk on hold. While the connected trunk junctor is in a held status, the transferring PABX station is forwarded to a local junctor by the trunk transfer circuit and a connection is established from the local junctor to a transferee PABX station. The trunk transfer circuit then completes the transfer by establishing a connection between the held trunk and the transferee PABX station via the held trunk junctor. Further circuitry is provided in the trunk transfer circuit to establish a three-way conference call between the connected trunk call (transferred party), the transferring PABX station, and the transferee PABX station, if desired. Also included in the trunk transfer circuit are circuits for releasing the local and trunk junctors or reestablishing the original trunk call if the trunk transfer cannot be completed

14 Claims, 25 Drawing Figures

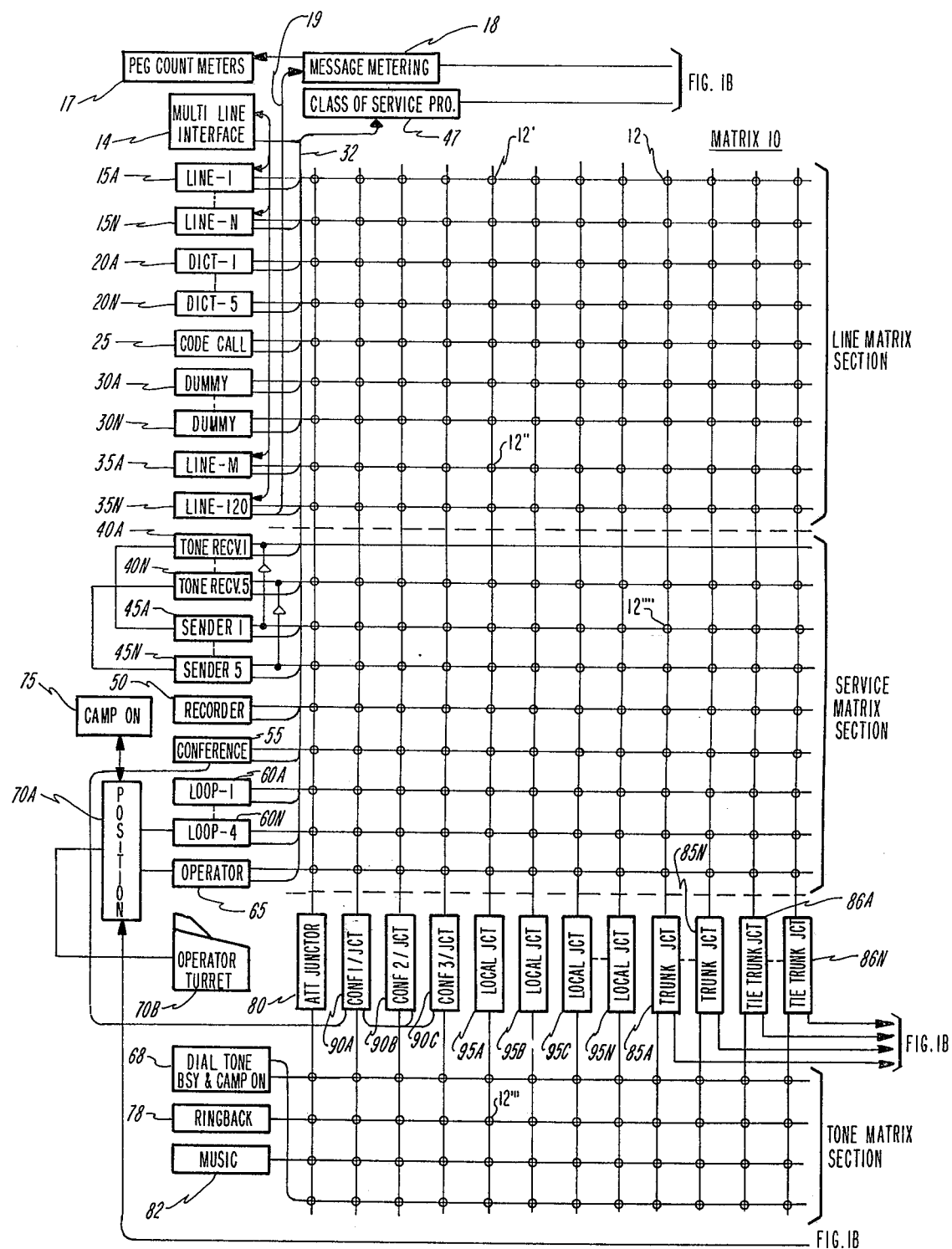
FIG. IA

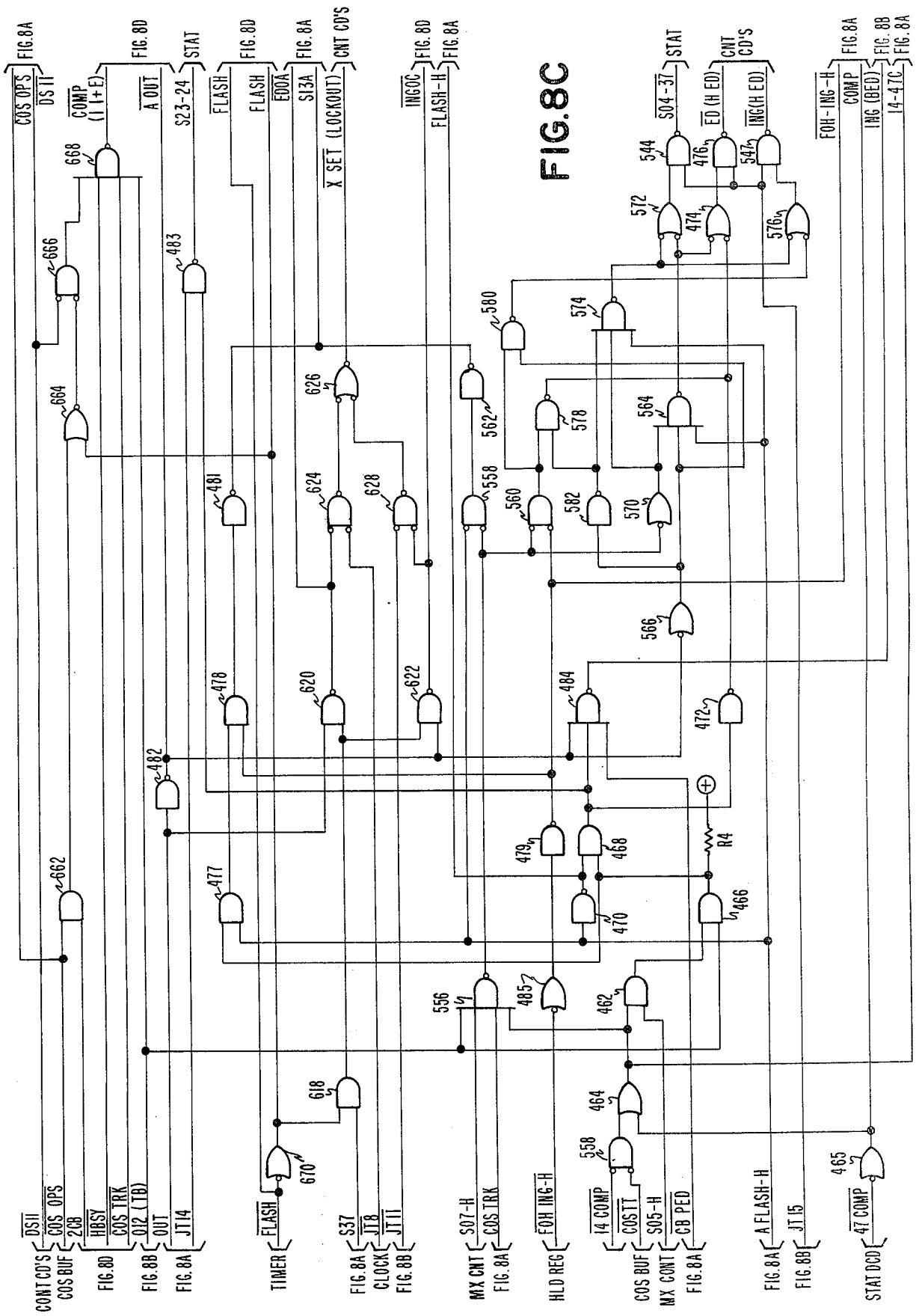

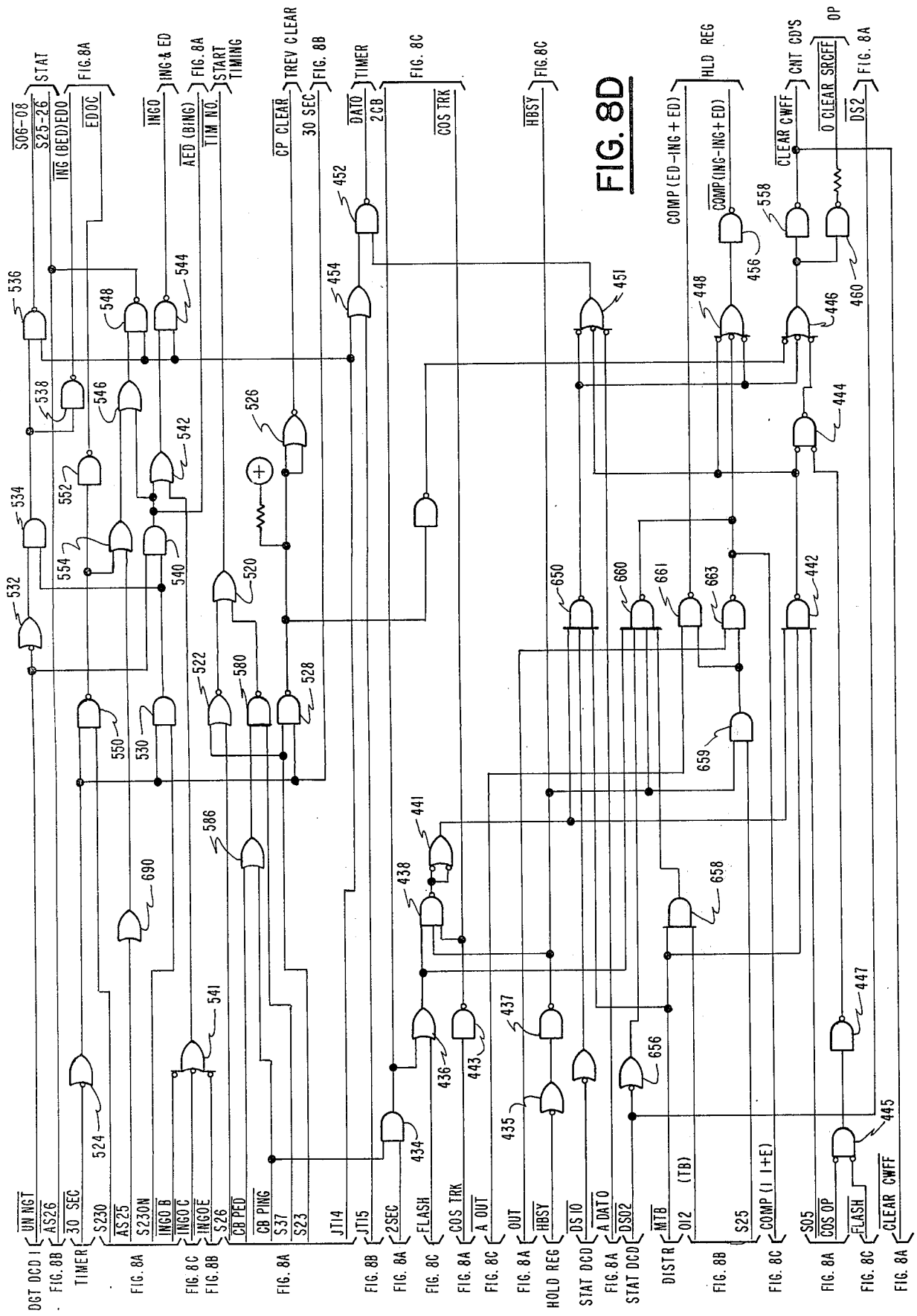

TRUNK TRANSFER CIRCUIT

BACKGROUND OF THE INVENTION

The present invention relates generally to special feature systems for an electronic private automatic branch exchange and more particularly to a trunk transfer feature for an electronic private automatic branch exchange which is built around a space divided solid state matrix.

Electronic private automatic branch exchanges are known in the art to provide circuitry for establishing audio paths between PABX stations or between central office trunks and PABX stations. these connections are usually accomplished through the use of a common control which directs the path finding and supervisory functions of a space divided crosspoint matrix on which the PABX station lines and central office trunk circuits appear. Normally, once a path is found between two appearances of the matrix, a sleeve lead is energized to hold the crosspoints of the matrix establishing the connection.

In addition to the normal control of connections between two PABX stations or a central office trunk and a PABX station, it is desirable in private automatic branch exchanges to provide certain special features to add to the flexibility of the exchange and provide additional enhancements desired by the customers. One such special feature that is useful and has gained customer acceptance in many PABX applications is that of trunk transfer.

The trunk transfer feature allows a PABX station (hereinafter called the "transferring station") which is connected to an established incoming or outgoing trunk call (hereinafter called the "transferred party") to hold the connection to the transferred party while signaling the common control to establish a connection to a transferred-to PABX station (hereinafter called the "transferree station") and then to connect the transferred party to the transferree PABX station. Thus, an incoming trunk caller reaching the wrong PABX station or wishing to talk with an individual at another PABX station after a first connection to a local station may be transferred to the desired transferee PABX station without having to redial. Similarly, a party connected to the PABX via an outgoing trunk may wich to talk to another PABX station after the first connection is completed and may be transferred without dialing.

In the past, many private automatic branch exchanges have provided the trunk transfer feature by including additional circuitry in the trunk design. Each turnk then contains transfer circuitry which permits the trunk connection (transferred party) to be held while the transferee party is being found and connected. As the number of trunks in a system increases this prior art technique increases the cost of providing the transfer feature. Not only is such a system unduly expensive, but it is also inefficient since the only transfer circuitry that is utilized during the trunk transfer is that associated with a particular trunk. Thus, much of the transfer circuitry remains unused a substantial portion of the time.

In other prior systems, transfer circuits are provided which may be accessed on a common basis through a service matrix. This access to common transfer circuitry is generally less expensive and more efficient than including transfer circuitry on individual trunks. However, certain portions of the transfer circuitry still are included on individual trunk circuits in order to access the common control for connection through the service matrix. Also, the access through the service matrix makes the trunk transfer feature traffic dependent in that an increase in the number of trunks decreases the probability of being able to access the common transfer circuitry.

Further, both of the above prior art transfer methods usually require a sleeve lead to be energized throughout the transfer process as any break in the sleeve circuit will drop the path found between marked matrix appearances.

Recently, an electronic private automatic branch exchange which is built around a space divided rectangular solid state switching matrix was developed to provide an exchange which is more dependable in operation and less subject to misoperation due to interference, cross-talk and other problems.

In this exchange one side of the solid state matrix provides line appearances which are connected to line circuits, tone receivers, senders and operator loops. The other coordinate side of the matrix provides junctor appearances for connection to an attendant junctor, local junctor and trunk junctors. The solid state switching matrix is a single stage matrix providing direct connection between line appearances and junctor appearances by the closing of a single crosspoint, and connection between lines within the system is effected simply by the interconnection of a pair of crosspoints associated with the respective lines and a selected junctor, thereby providing a greatly decreased amount of switching for establishing a connection through the matrix.

The electronic private automatic branch exchange providing the above features is more fully described in copending application, entitled, "Electronic Private Automatic Branch Exchange", Ser. No. 431,928, filed on Jan. 9, 1974, in the names of Uwe A. Pommerening and Glenn L. Richards, assigned to the same assignee as the present application, and the disclosure of which is incorporated herein by reference.

The control system for the matrix of the above-referenced exchange is more fully described in a copending application, entitled, "Matrix Control For Electronic Private Automatic Branch Exchange", Ser. No. 431,878, filed on Jan. 9, 1974, in the names of Uwe A. Pommerening and Glenn L. Richards, assigned to the same assignee as the present invention, and the disclosure of which is incorporated herein by reference.

A tone control arrangement for the above referenced exchange is more fully described in a copending application, entitled, "Tone Control For Electronic Private Automatic Branch Exchange", Ser. No. 431,885, filed on Jan. 9, 1974, in the names of Glenn L. Richards and Uwe A. Pommerening, assigned to the same assignee as the present invention, and the disclosure of which is incorporated herein by reference.

SUMMARY OF THE INVENTION

The present invention provides the special feature of trunk transfer in an electronic private automatic branch exchange which is built around a space divided rectangular solid state matrix.

The transfer of an incoming or outgoing trunk call to another PABX station (transferee station) is under the control of a trunk transfer circuit. THe trunk transfer circuit is commonly accessed on a time shared basis and provides control of the local and trunk junctors in which the trunk transfer takes place.

For sensing a request for a transfor, the trunk transfer circuit includes detecting means that are enabled by a transfer indication signal produced by a transferring PABX station. Once the detecting means has sensed the transfer indication signal, means for holding the trunk junctor of the established call are utilized to prevent the trunk party (transferred party) from being released. The trunk transfer circuit also includes means for signaling an intended transferee PABX station by way of a local junctor while the transferred party is being held.

When the intended transferee party has responded to the signaling, the trunk transfer circuit completes the transfer by establishing a connection between the transferred party and the transferee PABX station via the trunk junctor connected to the original call.

The trunk transfer circuit also provides circuitry for establishing a three-way conference between the transferring, the transferred, and the transferee parties. The additional circuitry accomplishes the conference by connecting the transferring and transferee PABX stations together as in a local call and then connecting the connected local call to the trunk junctor of the original call.

Thus, the invention provides a transfer circuit that overcomes many of the prior art inefficiencies including limited accessability and excess trunk circuitry. The transfer circuit is accessed on the same time shared basis as in the common control, and, therefore, access to the transfer circuitry is not limited by the traffic capability of a service matrix.

Also, the control of the local and trunk junctors by the transfer circuitry eliminates the necessity for including path finding and signaling circuitry on each type circuit, and all trunks in the system are identical whether or not they are connectable to the transfer circuitry.

Therefore, it is an object of the present invention to provide the special feature of trunk transfer in an electronic private automatic branch exchange which is built around a space divided rectangular solid state switching matrix.

It is another object of the invention to provide the special feature of trunk transfer as a time shared commonly accessible circuit in the common control.

It is a further object of the invention to eliminate the differences between circuitry of trunk circuits with transfer capability and those without.

It is still another object of the invention to provide a transfer circuit capable of establishing a three-way conference call between the transferred, transferring and transferee parties.

These and other features, objects, and advantages of the present invention will become clearer and more evident from the following detailed description of a preferred embodiment viewed in conjunction with the accompanying drawings, wherein:

BRIEF DESCRIPTION OF THE DRAWINGS

FIGS. 1A and 1B, in combination, form a schematic block diagram of the electronic automatic branch exchange incorporating the present invention;

FIGS. 8A–D are detailed electrical schematic wiring diagrams of circuitry arranged to implement the decisional sequences shown in FIG. 7.

DETAILED DESCRIPTION OF THE PREFERRED EMBODIMENT

Figure 1B:
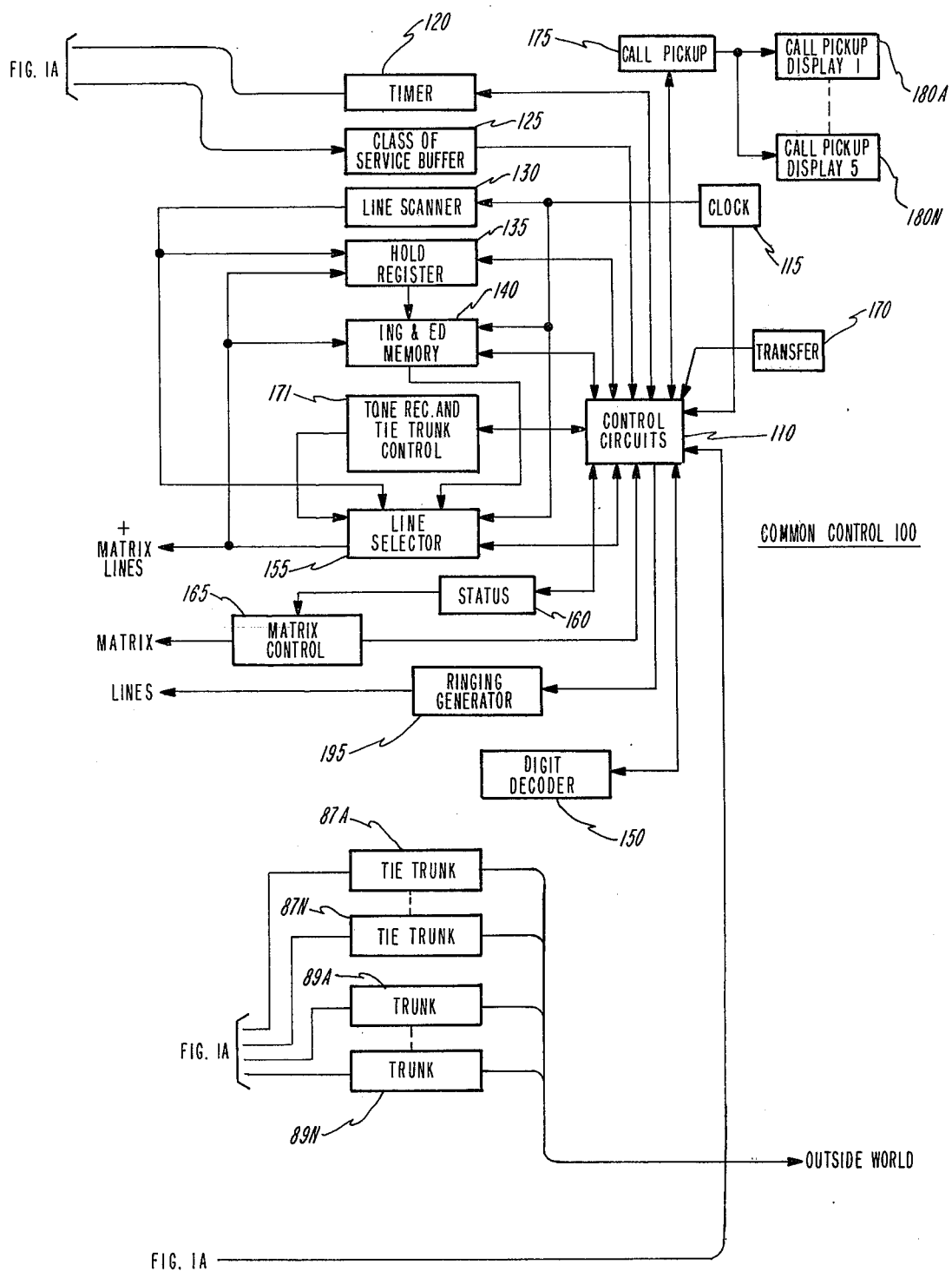

The present invention will now be described in conjunction with an electronic private automatic branch exchange which is built around a space divided solid state matrix. The exchange is shown in system block diagrams in FIGS. 1A and 1B and includes a solid state switching matrix 10.

The matrix 10 is a single stage rectangular array of cross-points divided into three sections, i.e., a line matrix section, a service matrix section and a tone matrix section, as seen in FIG. 1. The matrix serves to establish a low impedance electrical path for passing audio signals between a selected one of a plurality of input leads and a selected one of a plurality of output leads.

Line appearances are provided on the left side of the line matrix section, as seen in FIG. 1, including a plurality of line circuits 15A through 15N and 35A through 35N. Between the line circuits there are provided connections to special lines which take the place of regular lines in the system. These special lines are dictation access circuits 20A through 20N, a code call circuit 25 and a plurality of dummy line tie trunks 30A through 30N.

Line appearances at the service matrix section take the form of a plurality of tone receivers 40A through 40N, a plurality of register senders 45A through 45N, an intercept recorder 50, a conference bridge 55, a plurality of operator loop circuits 60A through 60N and an operator line circuit 65. The number of tone receivers, register senders and operator loop circuits, like the number of line circuits connected to the line appearance inputs of the matrix 10 depend upon the traffic requirements and size of the system. It will be obvious from the following description that an increase or decrease in the number of these circuits is easily accomplished by merely changing the overall size of the matrix 10.

The outputs of the matrix 10 are provided in the form of a plurality of junctor appearances, as seen in FIG. 1. The junctor appearances are associated with an attendant junctor 80, a plurality of conference junctors 90A through 90C, a plurality of local junctors 95A through 95N, a plurality of trunk junctors 85A through 85N and a plurality of tie trunk junctors 86A through 86N. The trunk junctors 85A through 85N are connected to corresponding trunks 89A through 89N, and the tie trunk junctors 86A through 86N are associated with ccrresponding tie trunks 87A through 87N.

The tone matrix section of the matrix 10 provides inputs on respective lines from a combined dial tone generator and busy-camp on tone generator 68, along with inputs from a ring-back tone generator 78 and music source 82. The outputs of the tone matrix section are connected through the respective junctors to the junctor appearances of the line and service matrix sections of the matrix 10.

The operator complex includes, in addition to the loop circuits 60A through 60N and the operator line circuit 65, an operator position circuit 70A to which is connected an operator turret 70B.

A camp-on circuit 75 providing a special feature in the system is also connected to the operator position circuit 70A. As another special feature of the system, a message metering circuit 18 and one or more peg count meters 17 are associated with the line circuits via a bus 19.

The matrix 10 functions to selectively connect an input from a line to a selected junctor by closing the appropriate crosspoint and to provide an appropriate tone through the selected junctor to the line by closing the appropriate crosspoint in the tone matrix section. Connection from one line to another line is also effected by closing the pair of crosspoints in the line matrix section associated with the respective lines and a common junctor.

The matrix 10 is designed to carry only the audio communication between lines or between a line and a trunk. The signaling associated with the establishment of the communication connection through the matrix 10 is handled outside of the matrix via a common bus 32 through a class-of-service programmer 47 connected to the common control equipment 100.

FIG. 1B schematically illustrates the various elements of the common control 100, the heart of which is formed by a plurality of control circuits 110 in the form of a hard-wired programmer. The timing of the various functions which are performed in the system under control of the control circuits 110 is regulated by the various signals produced by a clock 115, which is directly connected to the line scanner 130, which serves to generate the line scanning signals, and is connected through the control circuits 110 to the various other elements in the common control 100 to provide a time base for the various functions thereof.

A timer 120 is also provided in the common control 100 to analyze the information concerning the line conditions and other information from the junctor and perform memory timing functions within the system. For example, on-hook and off-hook timing, time-outs, flash detection and other conventional timing functions are performed by the timer 120. In this regard, the timer 120 operates with the control circuits 110 to perform whatever timing functions are necesary within the system.

A class-of-service buffer 125 forms an interface between the class-of-service programmer 47 and the logic circuitry of the common control 100. Thus, the various line conditions which are derived through the class-of-service programmer 47 each time a line is addressed will be passed to the control circuits 110 through the class-of-service buffer 125.

The line scanner 130 is driven from the clock 115 and serves to scan each of the lines in turn continuously to detect requests for service. Im this regard, the lines are addressed by the line scanner in conjunction with the scanning of the junctors, a line being addressed from the line scanner at the end of each complete scan of all of the junctors, as will be described in greater detail in connection with line selection and matrix control operation. Each time a line is addressed by the line scanner 130, the calling bridge relay information within the line is forwarded via the common bus 32 and the class-of-service programmer 47 to the control circuit 110 in the common control 100 via the class-of-service buffer 125. In this way, the status of the line, i.e., whether or not it is requesting service of the system, is monitored during the continuous scanning of the lines by the line scanner 130.

A hold register 135 is provided as a temporary memory which is used for various systems operations in conjunction with information stored in conjunction with the various junctor circuits. As will be described in greater detail, the system stores the identity of the lines associated with any junctor during the entire duration of a cell in the system, so that during the establishment of the communication connection between parties and in providing various functions requested by the parties during the call, it is necessary at various times to temporarily store information as functions are being performed within the system by the common control 100. The hold register 135 provides the temporary storage capability in the system.

The system includes an ING and ED memory 140 which forms the basic junctor memory portion for storing the calling and called numbers identifying the lines associated with each of the junctors. The memory 140 includes storage positions assigned to each of the junctors, which storage positions are continuously scanned by clock signals derived from the clock 115. Thus, if a junctor is associated with one or more lines, the scanning of the portion of memory 140 assigned to that junctor will produce the calling and/or called numbers of those lines which are stored therein. In this way, the identity of the crosspoints in the matrix 10 associated with the line or lines involved with the junctor can be identified.

A line selector 155 receives line designations from the line scanner 130 and from the junctor memory 140, and in response to the clock signals from the clock 115 selectively addresses crosspoints in the matrix 10 and selected lines at the proper times. As already indicated in connection with the description of the solid state crosspoint matrix 10, addressing alone of the crosspoint will open the crosspoint, while addressing in combination with a positive request for actuation of the crosspoint will close the crosspoint. Whether or not the crosspoint is to be opened or closed is determined by the status of the call based upon the progress of the connection as determined by the control circuits 110 from the information derived from the lines via the class-of-service programmer 47 and class-of-service buffer 125. The system control progresses in states, with the individual states being monitored by the status circuit 160, which stores the state in which any particular call is in and advances under control of the control circuits 110 as the call progresses from one state to the next in a particular program. Thus, the information concerning the desired condition of the crosspoint, i.e., whether it is to be open or closed, is derived from the status circuit 160. If the crosspoint which is addressed from the line selector 155 is to be closed for a particular call, a matrix control 165 will receive information from the status circuit 160 to this effect and generate a positive request signal for closing of the crosspoints. If the crosspoints are not to be closed, the matrix control 165 will produce no output as the crosspoints are addressed, thereby effecting an automatic opening of the crosspoints.

A ringing generator 195 of any known form is provided for application of ringing current to the lines under control of the control circuits 110. While the ringing generator is in itself a conventional circuit, the application of ringing to the line in the system of the present invention is somewhat different than known systems in view of the multiplex addressing of the various lines by the common control. Thus, the output of the ringing generator 195 may be connected simultaneously to all lines since the lines are addressed in turn during the scanning of the junctors associated therewith. In this way, the system requires only a single ringing generator, thereby materially simplifying the system in reducing the costs thereof.

The digit decoder 150 performs analysis of the incoming digits and makes decisions concerning these received digits. For example, the digits received by the digit decoder 150 are analyzed for line-to-line calls, line-to-trunk calls, toll restrictions and other information. The information provided by the digit decoder 150 then serves to initiate various control functions within the control circuits 110 as the various states of the call progress.

As a special feature, the system provides a transfer circuit 170 which effects transfer between trunks and lines, as may be required.

A further special feature of the present invention is embodied in a call pickup arrangement including a call pickup circuit 175 and a plurality of call pickup displays 180A through 180N. In accordance with this special feature, a party may respond to a call to another party identified on the call pickup display.

The function of the various elements of the system of the present invention will become clearer from a general description of various basic functions of the system.

BASIC SYSTEM OPERATION

The lines are continuously scanned from the line scanner 130 via the line selector 155 in the common control 100, so that a line circuit requesting service will ultimately be addressed permitting the state of the calling bridge relay in the line circuit to be passed on through the class-of-service programmer 47 along with the class-of-service information concerning that line circuit to the common control 100.

Assuming that the line circuit 15A has gone off-hook and is requesting service, this line will ultimately be addressed by the line selector 155 when the line scannerr 130 reaches this line in its scan of all of the lines. At the same time, the line selector 155 will also address all of the crosspoints of the matrix 110 associated with that line circuit. In this case, all of the crosspoints associated with the line circuit 15A along the first horizontal of the matrix including the crosspoint 12' will be addressed. If, as a result of some misoperation, one or more of these crosspoints has been inadvertently closed, the addressing of the crosspoints at this time will automatically open the crosspoints in the absence of the positive control from the matrix control 165 indicating that one or more of these crosspoints should be closed. Since the line 15A has just requested service, none of the crosspoints should be closed and therefore the status circuit 160 will provide no indication to the matrix control 165 that any of the crosspoints involved should be closed. In view of the fast scanning times provided within the system for scanning the lines and junctors, it can be seen that a misoperation of a crosspoint will be immediately corrected so that no effect upon any communication connection through the matrix will result, nor will such crosspoint misoperation be noticeable to either party except for a click as the crosspoint is opened or closed to correct the state thereof. Further details concerning the unique operation of the matrix under control of the line scanner 130, line selector 155 and matrix control 165 are disclosed in our copending application Ser. No. 431,878, filed on Jan. 9, 1974, and assigned to the same assignee as the present application.

When the control circuit 110 receives an indication through the class-of-service buffer 125 that the line circuit 15A has requested service, the control circuits 110, which include a junctor allotter and is more fully described in copending application Ser. No. 448,288, filed on May 5, 1974, and assigned to the same assignee as the present invention, will assign a free junctor to the line circuit and request that the calling line number of the line circuit 15A be stored in the junctor memory 140 in the time position assigned to the selected junctor. The control circuits 110 will also address the status circuit 160 to record in the memory thereof that the call associated with the selected junctor is in the first state of operation. Assuming that the junctor allotter in the control circuits 110 selects the local junctor 95A, the calling line number of the line circuit 15A will be stored in the memory position of the junctor memory 140 permanently assigned to the local junctor 95A, and each time the junctors are scanned, the line number of the calling line 15A will be forwarded to the line selector 155 so that the line 15A can be addressed at this time and the crosspoint associated both with the line 15A and the junctor 95N, i.e., the crosspoint 12' can be addressed. The status circuit 160 indicates to the matrix control 165 that the call is in a state wherein the crosspoint 12' should be closed, and therefore the matrix control 165 will forward a positive request for closing the crosspoint 12' at the time the crosspoint is addressed. As a result, the line circuit 15A will be connected through the matrix 10 to the local junctor 95N.

At the same time that the crosspoint 12' is addressed and closed to enable connection between the line circuit 15A and the local junctor 95A, the matrix control 165 under control of the status circuit 160 addresses the crosspoints of the tone matrix section of the matrix 10 associated with the dial tone generator 68 so that the crosspoint 12''' will be closed connecting the dial tone generator 68 through the local junctor 95A to the line circuit 15A. The line circuit may then commence to dial the number of the party to which it desires connection.

The control circuits 110 in the common control 100 will advance the status circuit 160 of the particular junctor 95A to state 2 if the calling line circuit has rotary dial equipment or to state 3 if the calling line circuit has TONE-DIAL (multifrequency dialing) equipment, as determined from the class-of-service information for that line circuit received from the class-of-service programmer 47. Each time the junctor 95A is scanned, the number of the calling line circuit 15A will be provided by the junctor memory 140 to the line selector 155 which will address the line permitting the calling bridge relay state to be monitored via the bus 32 and class-of-service programmer 47 in the common control 100. The digit decoder 150 will accumulate the calling bridge relay states and provide to the control circuits 110 the digit information which will be stored in the memory portion of the junctor memory 140 assigned to the junctor. Eventually, the junctor memory 140 will have stored in the portion thereof assigned to the junctor 95A both the calling and called line numbers.

When it is determined by the timer 120, and more fully described in copending application Ser. No. 542,947, filed on Jan. 22, 1975, and assigned to the same assignee of the present application, that the calling line 15A has completed dialing, the control circuits 110 will advance the status circuit 160 to record state 4 in the position of the memory thereof assigned to the junctor 95A. State 4 relates to busy test, and more fully described in copending application Ser. No. 543,042, filed on Jan. 22, 1975, and assigned to the same assignee of the present application, of the called line circuit. If the called line circuit is found to be busy, the tone matrix section of the matrix 10 is once again addressed from the matrix control 165 to connect busy tone from the generator 68 through the local junctor 95A to the calling line circuit 95A. On the other hand, if the called line circuit is free, the control circuits 110 will advance the status recorded in status circuit 160 to state 5 for application of ringing from the ringing generator 195 to the called line circuit and to address the tone matrix section of the matrix 10 to connect the ring back tone generator 78 through the local junctor 95A to the calling line circuit 15A. The control over the tone matrix section of the matrix 10 to provide for connection of dial tone, busy tone, ring back tone and music to the lines through selected junctors is described in greater detail in our copending application Ser. No. 431,885, filed on Jan. 9, 1974, and assigned to the same assignee as the present application.

Figure 3:
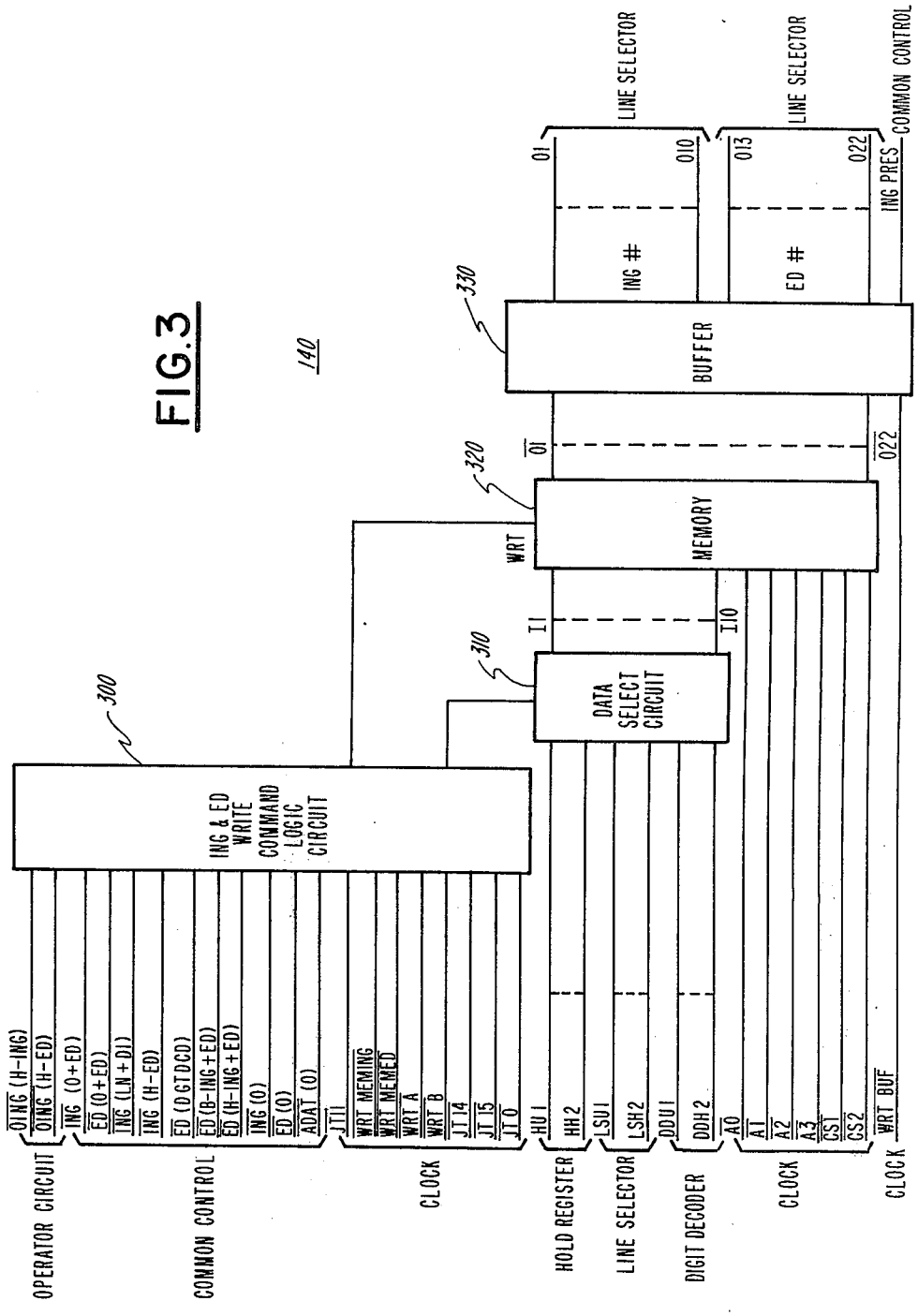
FIG. 3 is a schematic block diagram of a junctor memory associated with the present invention.

The matrix control 165, upon receiving the calling and called line members from the junctor memory 140 as the junctor 95A is scanned, will address the crosspoint 12' and also the crosspoint associated with the called line, for example, crosspoint 12" associated with the line 35A. Thus, when the called party answers in response to the applied ringing, he will be connected via crosspoints 12' and 12" in the martrix 10 to the calling party, and the respective line circuits 35A and 15A will receive ground to maintain crosspoint bias, as described in connection with FIG. 3, from the local junctor 95A during the duration of the call. At this time, the status circuit 160 is advanced by the control circuits 110 to status 7, indicating to the system that a local call is in progress.

Where the lines are equipped with TONE-DIAL equipement, this class-of-service for the line circuit is indicated to the common control by the class-of-service programmer 47. In this regard, the class-of-service programmer 47 typically includes a panel having selected class-of-service plugs so that the features of the system may be allocated on a real time line basis and the information with respect thereto may be provided to the common control 100. Thus, in addition to providing a path for the calling bridge relay information from the lines, the class-of-service concerning the particular line for use by the common control 100.

When a call is in state 3 indicating dialing from TONE-DIAL equipment, the common control 100 effects connection via the matrix between the calling line and an available one of the tone receivers 40A through 40N. The tone receiver converts the TONE-DIAL signal into the corresponding binary number, which is received by the common control 100 and placed into the ING or ED memory 140.

Since the operator loop circuits 60A through 60N are merely provided as line appearances at the input of the matrix 10, the functions associated with the operator positions are greatly simplified. Because of the fast switching capability of the crosspoints in the matrix 10, the split functions normally associated with incoming connections to the operator may be performed with the matrix crosspoints. Thus, special trunk circuits having separate operator access with split tip and ring pairs, as normally required in conventional systems, are not required in the system of the present invention.

In addition, since the split functions are performed in the present system within the matrix 10 by selective operation of the crosspoints, the operator loop circuits and position circuits which normally control such functions can be greatly simplified. Since the operator loop circuits are effectively line circuits in the present system, switching a trunk to a line or to an operator is the same function for the system. This makes it also possible to greatly simplify the loop circuits.

Since the attendant junctor 80 controls the crosspoints for the required split functions in connections to the operator complex, hardware for special trunks, like information trunks, is not required in the system. The junctor performs the information trunk duties without requiring extra equipment, thereby simplifying the system. Also, special access trunks for the operator, which are usually quite complex are not required. The junctor circuit once again takes care of the duties normally provided in this regard. In addition, due to the elimination of information trunk hardware, tendem operation for operator extended calls to trunks between information trunks and the central office trunks is not required. The operator is accessed by the line via the local junctor which acts as the information trunk, and when the operator extends the call to a central office trunk, the local junctor is dropped and the central office trunk junctor takes over the duties.

In outgoing trunk calls, it is necessary for the system to switch from a local junctor to a trunk junctor. In this regard, the line circuit is initially connected to a local junctor 90A-90C upon detection of the request for service in the manner described above by closing the crosspoint in the matrix 10 common to the line circuit and a selected available local junctor. In the foregoing example, by closing local junctor 95a. An addressing of the tone matrix section provides connection of the dial tone generator 68 through crosspoint 12''' and the local junctor 95A to the line circuit 15A. When dialing commences, the crosspoint 12''' is released, disconnecting dial tone from the line circuit and the dialing impulses are received in the common control 100 via the class-of-service programmer 47. The digit decoder 150 for out-going trunk calls will recognize the first digit as a request for access to a trunk circuit and the control circuits 110 will indicate the need to connect to a trunk junctor. The junctor allotter in the control circuits 110 will select an available trunk junctor, for example, the junctor 85A connected to the trunk 89N.

As can be seen, with the arrangement of the present invention, many different functions can be performed during the time in which a junctor is being scanned through selective control of various crosspoints within the matrix 10 under control of the common control 100 during designated time slots of the junctor scan period, as will be described in greater detail in connection with the system timing.

SYSTEM TIMING

Figure 2C:
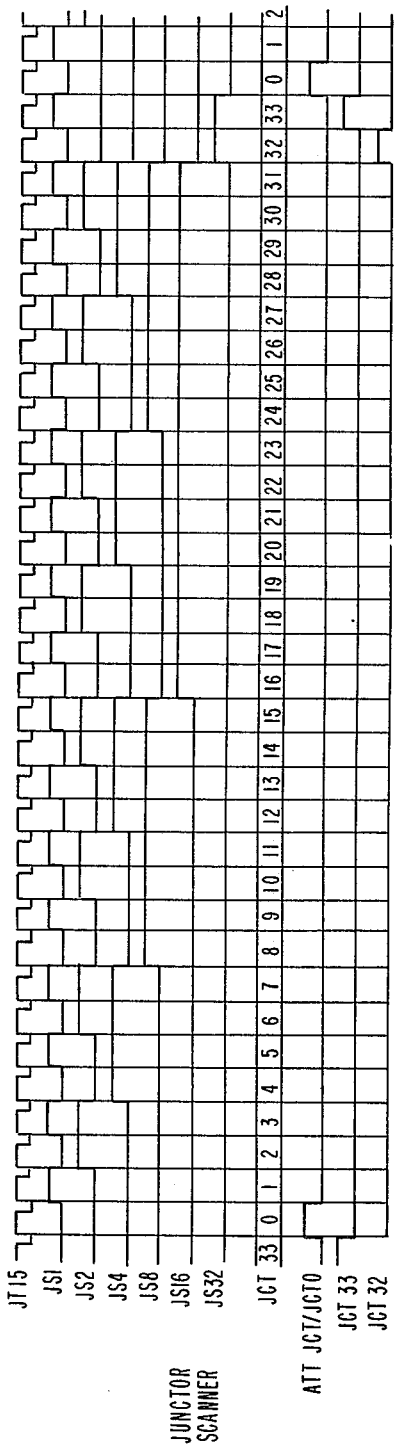
FIGS. 2A, 2B and 2C are waveform diagrams of clock signals used to control the timing functions within the system.
Figure 2A:
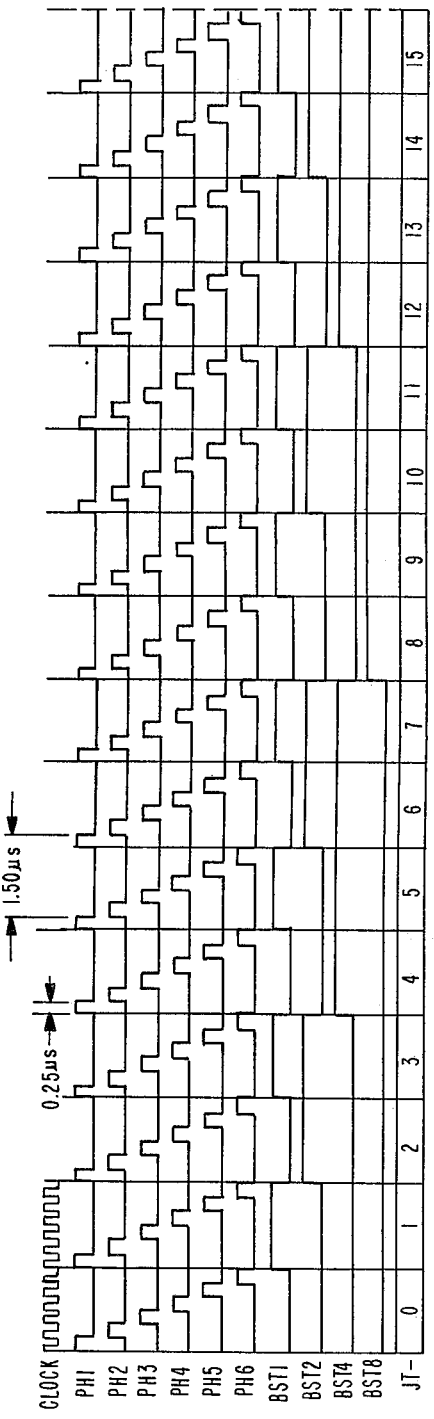
Figure 2B:
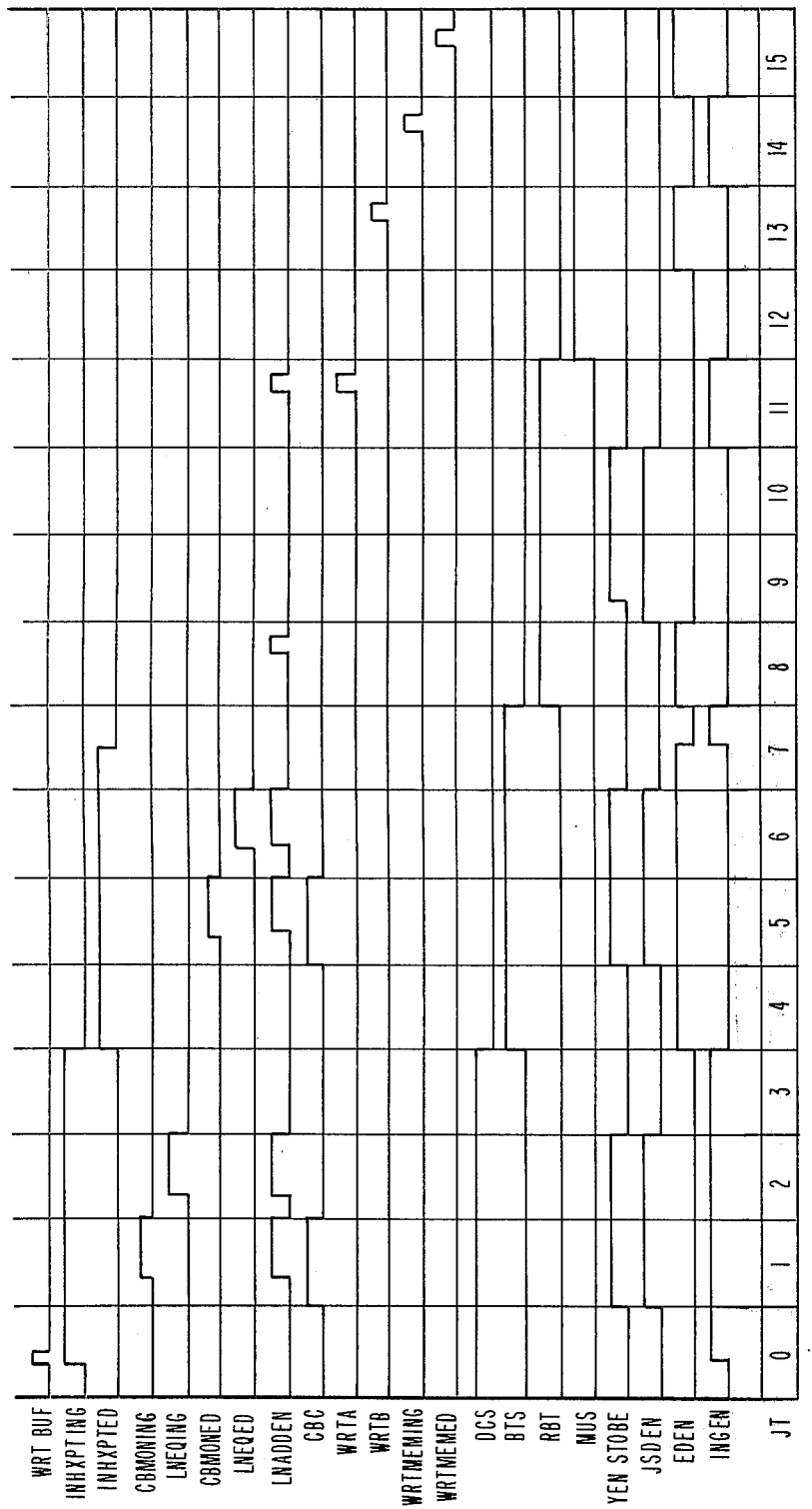

The system timing is controlled by the clock 115 in the common control 100 on the basis of various clock signals such as presented in FIGS. 2A through 2C. Typically, the clock 115 includes a 4 MHz crystall oscillator connected to a divider chain and various decoders to produce the required clock signals for controlling the various elements of the system.

As already indicated in the general system description, the junctor memory 140 includes a storage position for each of the junctors in the system and this memory is recirculated so that the information stored in each junctor position is scanned successively during a recurring time frame. In the embodiment disclosed, thirty-two junctors are connected to the output of the matrix 10, so that the junctor memory 140 will include 32 junctor time positions. In addition, the junctor memory 140 also includes time positions 32 and 33 which represent time periods during which a scanning of the lines is effected. Thus, after all junctors have been scanned, the line number designated by the line scanner 130 will be addressed during the time positions 32 and 33 to determine whether there is a request for service in connection with that line. At the end of each 32 time positions, the line scanner 130 will be advanced to the next line, with the result that the lines are scanned one at a time at the end of each complete scan of the junctors.

Each junctor time position is subdivided into junctor time slots during which the various functions required in connection with the call associated with the particular junctor are performed under control of the control circuit 110. During one or more of the time slots of each junctor time position, one or more functions may be performed by various elements of the common control 100 as required by the state of the particular call which is under the control of the central circuits.

Figure 4:
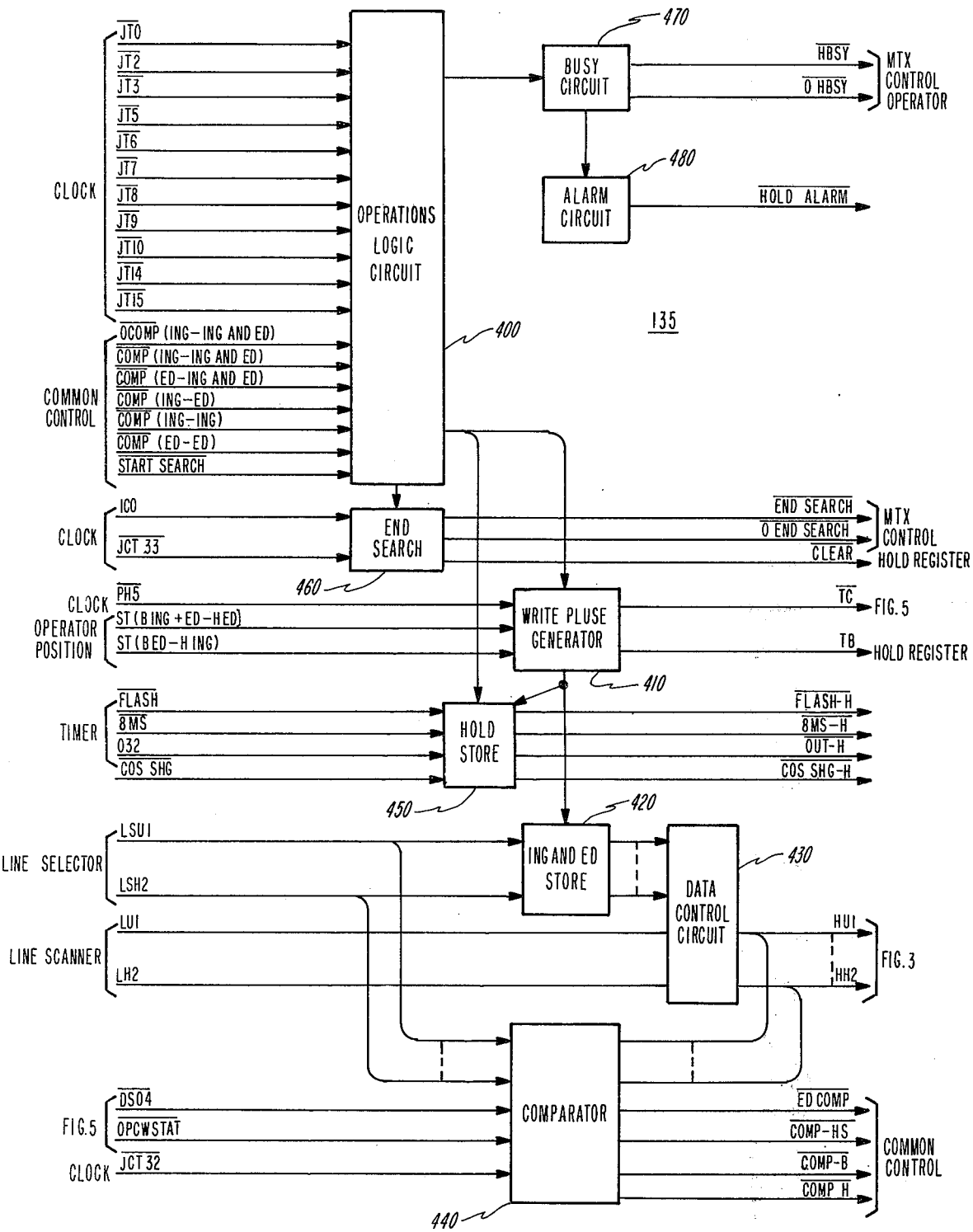
FIG. 4 is a schematic block diagram of the hold register shown in FIG. 1B.

FIG. 4A illustrates the output of a 4 MHz crystal oscillator (defining a portion of the clock 115) from which a plurality of phase signals PH1 through PH6 are derived by a clock phase generator producing a division by six of the basic frequency. The output of the clock phase generator is connected to a bit time slot counter which effects a division by 16 to produce the binary bit time slot signals BTS1 through BTS8. A decoding of the four bit binary time slot signals produces the sixteen junctor time slot signals JT0 through JT15.

Further decoding of the binary bit time slot signals BTS1 through BTS8 also produces various timing signals which are utilized throughout the system. Those timing signals which will be utilized in the various common control circuits to be described below are illustrated in FIG. 4B in relation to the sixteen junctor time slot signals JT0 through JT15. The function of these timing signals will be described in connection with the description of the detailed operation of the various common control elements.

FIG. 4C illustrates the waveforms which are derived from the junctor scanner portion of the clock 115. A further division by 34 produces the junctor scan signals JS1 through JS32. A decoding of these junctor scan signals then produces the junctor signals JCT0 through JCT33. Additional decoding produces the signal ATT JCT which represents the junctor 0 position, as well as the junctor 32 and junctor 33 signals, JCT32 and JCT33.

THE STATUS CIRCUIT

Figure 5:
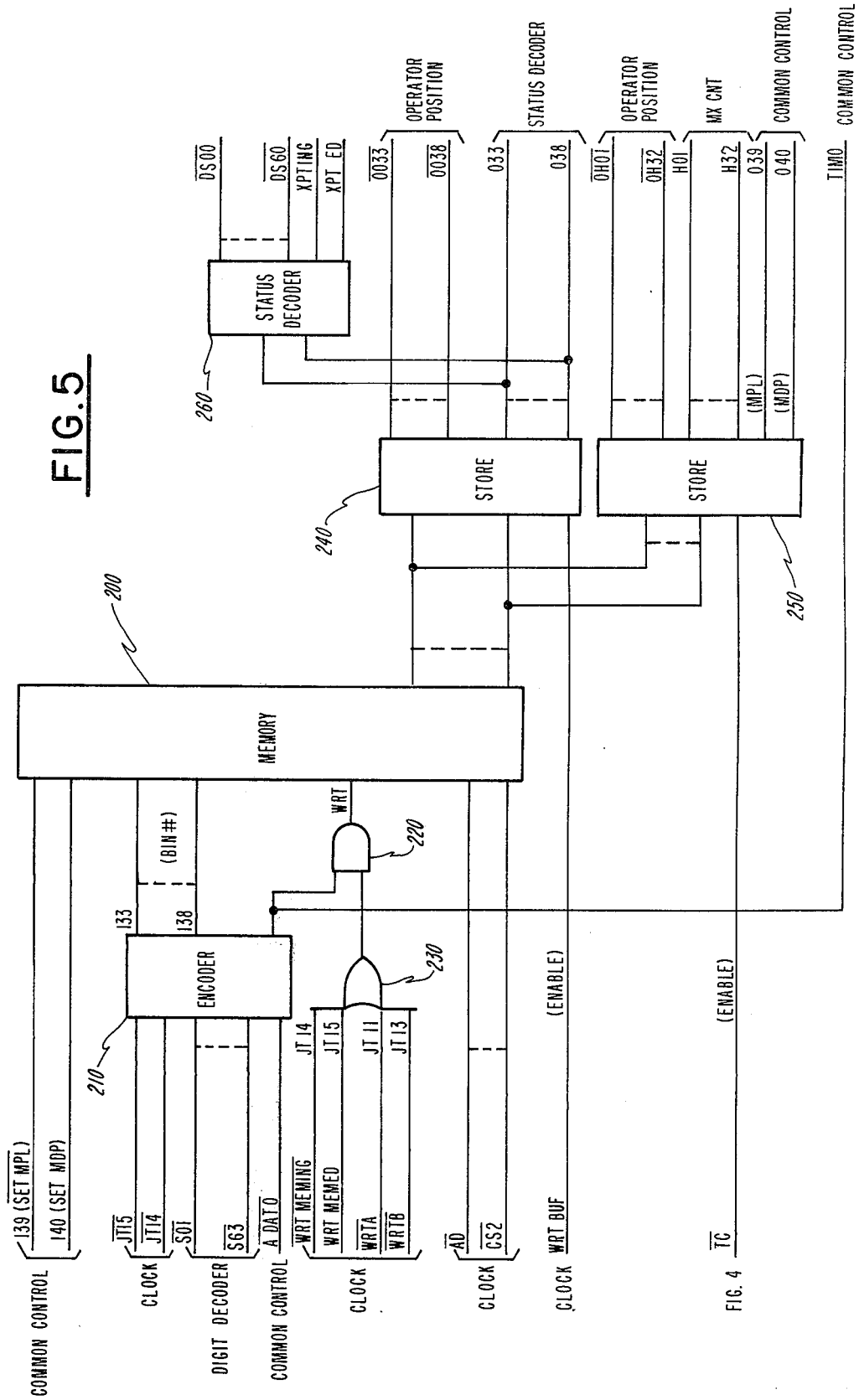
FIG. 5 is a schematic block diagram of the status circuit shown in FIG. 1B.

The status circuit 160 (see FIG. 5) basically forms a memory including a storage position for each of the junctors to store the state of the call associated with each of the junctors. As already indicated in the general system description, the common control 100 steps progressively through various states during which various operations are performed under control of the control circuits 110 to perform the functions required by the system. To determine what functions need to be performed during each junctor scan, the control circuits 110 determine from the status circuit 160 the state of the call associated with that junctor. As the functions associated with each state are completed, the control circuits 110 advance the status circuit 160 to the next state for the particular junctor involved so that a continuous record of the state of the call associated with each junctor is maintained within the status circuit.

In the status circuit, the memory 200 includes 34 junctor positions for the junctors JCT0 through JCT31 as well as the junctor times JCT32 and JCT33. The status of the call associated with each junctor is stored in the junctor times of the memory 200 in binary form, and therefore, an encoder 210 is provided to receive from the control circuits 110 the status signals SO1 through S63 and provide the binary equivalents thereof on output lines I33 through I38 to the memory 200. Certain of the status signals SO1 through S63 are time shared at the input to the encoder 210 under control of the clock signals JT15 and JT14 from the clock 115. A further input of the encoder 210 from the control circuits 110 is the signal A DAT O indicating that all data is to be zeroed, i.e., the status stored in connection with a given junctor is to be 0, for example, when a call has been terminated. The status indications are applied from the encoder 210 to the memory 200 during various time slots by controlling the gate 220 from the output of gate 230. The clock signals WRT MEM ING, WRT MEM ED, WRTA and WRTB generated during the junctor time slots JT14, JT15, JT11 and JT13, respectively, are applied through the gate 230 to enable gate 220 to apply the write signal WRT to the memory 200 permitting the status data from the encoder 210 to be written into the junctor period of the memory. The junctor periods are continuously scanned by the clock signals AO through CS2 derived from the memory address generator controlled from the clock by the junctor signals JS1 through JS32.

In addition to the binary outputs I33 through I38 from the encoder, the memory 200 also receives direct codes of states I39 and I40 from the control circuits 110. The binary status code is read out of the memory 200 into a pair of buffer stores 240 and 250 under control of the enable signals WRT BUF and TC from the clock and hold register, respectively. The buffer store 240 provides the binary outputs 0033 through 0038 to the operator complex, and the signals 033 through 038 to the control circuits 110 and the matrix control 165. The signals 033 through 038 are also applied to a status decoder 260 which provides a binary-to-decimal conversion of the signals into status signals DS00 through DS60, which signals are then applied to various elements of the common control to permit various functions to take place during each designated state.

The buffer store 250 is provided for use with the hold register as a hold-over memory portion for hold register searches. The binary status signals OH01 through OH32 are applied to the operator complex, while the signals H01 through H01 through H32 are applied to the matrix control. The signals 038 and 040, which are direct codes of status, are applied to the control circuits 110.

A time zero signal TIMO is derived from the encoder 210 to indicate to the timer each time a state changes in connection with a given junctor so that the timing functions performed by the timer may be reset to zero.

JUNCTOR MEMORY

The junctor memory 140 (see FIG. 3) includes an ING and ED write command logic circuit 300 which receives various command signals from the control circuits 110 along with junctor time slot signals from the clock and in turn controls the storage and read out of data into and out of a memory 320. The logic circuit 300 receives various command signals for storage of calling and called line numbers in designated locations of each junctor memory portion, which logic signals serve to control a data select circuit 310 receiving line numbers from the hold register 135 on binary inputs HU1 through HH2, from the line selector 155 on binary inputs LSU1 through LSH2, and from the digit decoder 150 on binary inputs DDU1 through DDH2. In accordance with the commands applied to the logic circuit 300, the line numbers from the hold register 135, line selector 155, and digit decoder 150 are gated to the memory 320 on leads 11 through 110 and stored in the memory 320 upon generation of the write command signal WRT from the logic circuit 300.

The commands received from the operator and the control circuits 110 relate to the storing of the called and calling numbers in the proper locations of each junctor portion of the memory. The command $\overline{\text{OING}}$ (H−ING) indicates that the calling number from the hold register 135 is to be stored in the ING number location of the junctor portion of the memory 320. Similarly, the command $\overline{\text{OING}}$ (H−ED) indicates that the called number from the hold register 135 is to be stored in the ING location associated with the attendant junctor. The command $\overline{\text{ING}}$ (O+ED) indicates placing the ED number from the operator in the ING register. The command $\overline{\text{ED}}$ (O+ED) indicates a request to place the ED number from the operator in the called portion of the memory. The command $\overline{\text{ING}}$ (LN+D1) indicates that the line number from the buffer is to be placed in the calling portion of the memory 320. The command $\overline{\text{ING}}$ (H−ED) indicates that the called number from the hold register 135 is to be placed in the calling portion of the memory 320. The command $\overline{\text{ED}}$ (DDT DCD) indicates that the number from the digit decoder 155 is to be placed in the called portion of the memory 320. The command $\overline{\text{ED}}$ (B−ING + ED) indicates that the calling and called line numbers from the buffer 330 are to be inserted in the called portion of the memory. The command $\overline{\text{ED}}$ (H−ING + ED) indicates a request that the calling and called numbers from the hold register 135 are to be placed in the called portion of the memory 140. The command $\overline{\text{ING (O)}}$ indicates that the number in the callling portion of the memory 140 is to be zeroed. The command $\overline{\text{ED(O)}}$ indicates that the number of the called portion of the memory 140 is to be zeroed. The command $\overline{\text{ADAT (O)}}$ indicates that all data is to be zeroed.

The signals from the clock 115 represent the various junctor time slots during which the various commands are to be executed. The clock also provides the binary signals A0 through A3, CS1 and CS2 which represent the memory addresses of the junctor portion corresponding to the junctor times JCT0 through JCT32. These junctor signals control the circulation of the data within the memory 320 so that in combination with the junctor time slots applied from the clock to the logic circuit 300, the data will be inserted into the proper junctor portion of the memory 320 during the prior time.

The output of the memory 320 is provided on leads $\overline{01}$ through $\overline{022}$ to a buffer store 330, which provides binary outputs 01 through 010 repesenting the calling number and binary outputs 013 through 022 representing the called number to the line selector 155. A further output ING PRES to the control circuits 110 indicates that the calling number is present and the output O RING PRES to the operator complex indicates that the calling number is present in the memory portion assigned to the attendant junctor.

As can be seen, the junctor memory basically provides for a memory storage position for each junctor in the system including a junctor position 32 for receiving the line number from the line scanner which is to be addressed for purposes of determining whether a request for service is present. In each memory portion associated with a particular junctor, the calling and called numbers will be stored depending upon the state of the call so that the system may determine each time a junctor is addressed which line circuits, if any, are involved in a call under the control of that particular junctor.

THE HOLD REGISTER

The hold register 135 (see FIG. 4) serves as a temporary memory for calling and called line numbers and other data generated within the common control 100 for use in controlling the functions required in establishing and maintaining a communication connection in the system. The hold register 135 also performs various comparison functions between line numbers, for example, in conjunction with busy searches, line scanning and other functions where a particular calling or called line number is to be compared with the calling and called lined number stored in the junctor memory 140.

The functions of the hold register are initiated upon receipt of a comparision request signal or a start search signal from the operator or control circuits 110 in the common control 100. The comparison requests signals and the start search signal are applied to an operations logic circuit 400 along with junctor time slot signals JT0 through JT15 from the clock 115. The comparison request commands include the command $\overline{\text{OCOMP}}$ (ING−ING and ED) indicating a request for comparison of the ING number from the attendant's junctor with all ING and ED numbers stored in the junctor memory. The command $\overline{\text{COMP}}$ (ING−ING and ED) indicates a request for a comparison of an ING number with all ING and ED numbers of the junctors other than the attendant junctor 80. The command $\overline{\text{COMP}}$ (ED−λ ING and ED) indicates a request for comparison of a called number with all calling and called numbers stored in the junctor memory. The command $\overline{\text{COMP}}$ (ING−ED) indicates a request for comparison of a calling number to all called numbers. The command $\overline{\text{COMP}}$ (ING—ING) indicates a request for comparing a calling number to all calling numbers stored in the junctor memory. The command $\overline{\text{COMP}}$ (ED—ED) indicates a request to compare a called number with all called numbers stored in the junctor memory.

The various comparison requests are acted upon during various junctor time slots by the operations logic circuit and result in enabling of a write pulse generator 410, which in turn enables a hold store 450 and an ING and ED store 420. The hold store 450 receives various data relating to flashes, time-outs, whether the call is an incoming or outgoing call designation of the station hunting group, etc., for use by various elements of the common control 100 during the course of the following operations.

The ING and ED store 420 in the hold register 135 stores the calling and/or the called line number associated with a particular junctor as received from the line selector on binary inputs LSU1 through LSH2. For example, if the hold register is requesting a comparison of a called number with all of the calling and called numbers stored in the junctor memory during the time junctor 10 is being scanned, the called number stored in the junctor memory position assigned to junctor 10 will be transferred from the line selector on leads LSU1 through LSH2 to the ING and ED store 420. The numbers stored in the ING and ED store 420 is then applied through the data control circuit 430 to one side of a comparator 440. During the subsequent scanning of the other junctors, the line selector will apply all calling and called line numbers stored in connection with these junctors on binary input lines LSU1 through LSH2 to the other side of the comparator 440. A comparison of the calling numbers stored in the store 420 with all of the calling and called numbers stored in the junctor memory is then effected by the comparator 440. Such a comparison, for example, would form part of the busy search where the system attempts to determine whether a called line is busy by scanning all of the junctor positions in the junctor memory to determine whether the line circuit has its number stored in connection with any other junctor. In this case, the status decoder forming part of the status circuit 160 would provide a signal $\overline{\text{DSO4}}$ to the comparator 440 enabling the comparision of the number stored in the ING and ED store 420 with all numbers received from the line selector 155.

Other comparisons which are preformed within the hold register relate to the scanning of the lines by the line scanner 130. At the end of each junctor 32 time position, the line scanner is advanced to the next line and will provide on binary input leads LU1 through LH2 in the hold register the line number which is to be scanned. This line number is applied to the data control circuit 430 which in turn applies it to one side of the comparator 440. During the subsequent scan of the information stored in the junctor memory in connection with the junctors, the comparator 440 will determine whether a comparison exists between the number designated by the line scanner and any number which may be stored in the junctor memory. For example, if a line goes off-hook it might be necessary for the system to determine whether an attempt is at that time being made to complete a call to that line circuit. Since the line scanner steps from one line to the next without knowledge of whether or not a line is already involved in a call, it is necessary for the system to determine before recognizing an off-hook condition from the line as a request for service to determine whether that off-hook condition is a result of a call already established by the system.

The comparator provides various outputs which may be required by the control circuits in the common control 100 for various functions. The output $\overline{\text{ED-COMP}}$ indicates that only a comparison of the called number has been detected. The outputs $\overline{\text{COMP-HS}}$ and $\overline{\text{COMP-H}}$ indicates a general comparison detected. The output $\overline{\text{COMP-B}}$ indicates that a comparision of a line with its own number has been detected.

The data control circuit 430 merely serves to multiplex the data which is to be applied to the comparator so as to avoid interference between comparisons associated with data stored in the ING and ED store 420 and comparisons involving the number supplied from the line scanner. The data provided from the data control circuit 430 to the comparator 440 is also supplied to the junctor memory on binary output lines HU1 through HH2.

The write pulse generator 410 is also responsive to control signals from the operator and a signal PH5 from the clock to effect certain shifting of data as required by the system. For example, the signal ST (B ING-+ED—H ED) is a request to store the calling and called numbers from the buffer in the junctor memory in the called portion of the ING and ED store of the hold register. The signal ST (B ED—H ING) indicates a request to store the called number from the buffer in the junctor memory in the calling portion of the ING and ED store 420 of the hold register. Such transfers of information from one junctor to the other are necessary for various operations and require a holding of this information between junctor scan times so that the transfer from one junctor position to another junctor positon in the junctor memory can be effected. This is accomplished in the ING and ED store 420 under control of the write pulse generator 410. The outputs TB and TC provide indications of the transfer operation and trunk consultation, respectively.

The hold register 135 also includes an end search circuit 460 connected to the operations logic circuit 400 and receiving the control signal ICO and the clock signal JCT33. The end search circuit 460 merely indicates when a complete scan of all the junctors has been completed. For example, if a search is conducted in the hold register in connection with information stored in junctor 10 position, it is necessary to compare this information with that stored in the junctor positions 11 through 31 and 0 through 9. When the scan once again reaches junctor 10, the end search circuit 460 indicates to the system that the search has been completed. The end search signal $\overline{\text{END SEARCH}}$ and $\overline{\text{O END SEARCH}}$ are generated along with a $\overline{\text{CLEAR}}$ signal to effect control of various elements in the common control 100 at the end of the search.

The hold register 135 also icludes a busy circuit 470 which is enabled whenever a comparison request or start search signal is applied to the operations logic circuit 400. The hold register performs one function at a time and is automatically made busy whenever a request for a comparison or search is received. When the hold register is busy, the signals $\overline{\text{HBSY}}$ and $\overline{\text{O HBSY}}$ are applied to the matrix control and operator complex, respectively. Since the hold register should not be busy for more than the time needed for one complete scan of all of the junctors, an alarm circuit 480 is provided in association with the busy circuit 470 which times the busy condition recorded by the busy circuit 470 for two complete scans of all of the junctors. If the busy circuit does not indicate the hold register to be free at the end of two complete scans of all of the junctors, an alarm signal $\overline{\text{HOLD ALARM}}$ is generated from the alarm circuit 480.

TRANSFER FLOW CHART

Figure 6:
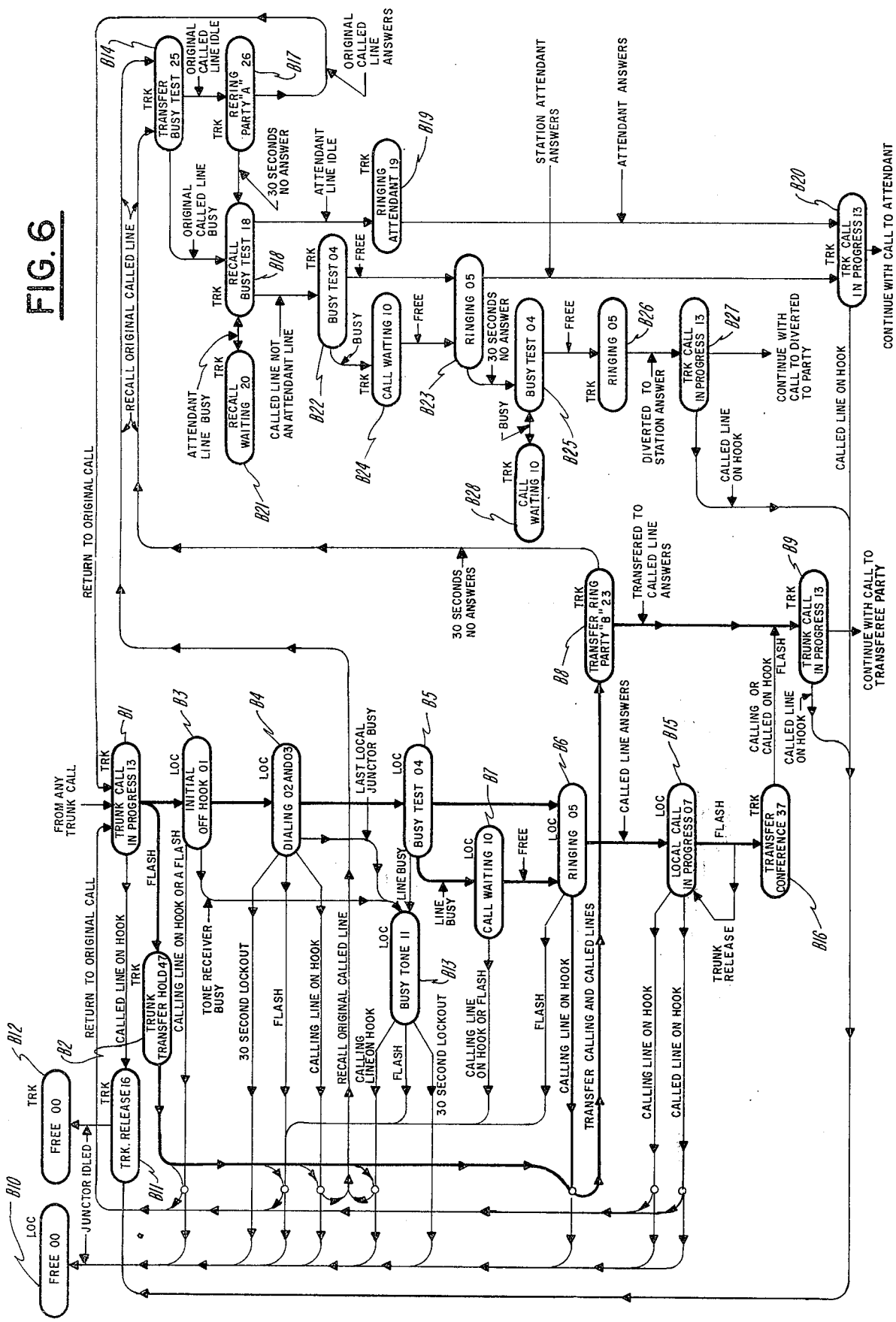
FIG. 6 is a status diagram illustrating the progression of the system through the transfer function.

A flow chart of the EPABX functions performed during a trunk transfer operation are illustrated in FIG. 6 and will now be more fully described hereinafter.

At the beginning of a trunk transfer operation, a trunk call is in progress and a transferring PABX station is connected to a trunk via one of the trunk junctors 85A–85N. The crosspoint between the transferring PABX station and the trunk junctor is closed and a conversation is normally taking place. The status of the trunk junctor establishing this trunk call is a status 13 (shown in block B1) which is stored in the portion of the status memory 160 associated with the particular junctor establishing the call. The transferring PABX station then indicates to the system that it is requesting a transfer function via a hookflash (which may be required to be of a certain minimum duration) which enables the timer 120 to determine that an outside party connected to a trunk should be transferred.

When the transferring PABX station hookflashes, the trunk junctor is put into a transfer hold status 47 (block B2) and the transferring station is forwarded to a local junctor having an initial off-hook status 1 (in block B3). The transfer hold status 47 allows the outside party to remain connected, while the transferring station requests connection to a particular transferee PABX station. The system provides dial tone to the transferring PABX station through the local junctor 95 that is seized in the transfer process.

After dial tone has been received in status 1, the transferring PABX station then dials the directory number of transferee station. When the dialing has been completed, the call progresses through status 2 for dial pulsing and status 3 for multifrequency dialing in the local junctor (block B4), and the status changes to status 4 (block B5). Status 4 indicates a busy test is being performed in the memory for the transferee PABX station and, if the transferee station is idle, the control circuit switches the local junctor 95 to status 5 (block B6) for ringing the transferee PABX station. This flow chart progression is similar to that described for connecting a local call as described above. When the call is in status 4, if call waiting is available (block B7) and the transferee station line which was dialed in the local junctor is busy, the junctor 95 will receive a status 10 indication will wait until the transferee station is idle and then will progress to the ringing status 5 (block B6) for connection.

If, during the status 5 ringing in the local junctor, the transferring PABX station goes on-hook the transferee station is forwarded to the connected trunk junctor 85 and the trunk junctor 85 receives a transfer ring party B status 23 (block B8). The ringing continues to the transferee station until that called line goes off-hook. When the transferee PABX station answers, a connection is established between the transferred party and the transferee PABX station thereby completing the transfer. At this point the trunk junctor 88 is again placed in status 13 (block B9) to indicate a trunk call is in progress.

In some instances it is not possible to complete a call transfer operation - for example if call waiting is not available and the transferee station is busy. In that case, the local or trunk junctors should be free for subsequent connections. In other instances, the original trunk call should be re-established between the transferring PABX station and the held outside party. Also, it would be advantageous to provide an alternative station to which the transferred party may be diverted in case the original call cannot be reconnected. These side paths of the trunk transfer flow chart are illustrated as with the lighter lines shown in the flow chart of FIG. 6.

If the transferring party goes on-hook or initiates a hookswitch flash during the status 1 (block B3) in the local junctor, the local junctor 95 is released (status 0 in block B10), and the transferring party is returned to the trunk junctor 84 (status 13 in block B1). If the initiating signal in status 1 was a hook-switch flash, the trunk junctor 85 continues with a trunk call in progress status 13, but if the transferring PABX station has gone on-hook, the trunk junctor 85 then becomes idle by progressing to the trunk release status 16 (block B11) and finally to free status 0 (block B12). These portions of the flow charts illustrate that once a transferring PABX station has indicated a desire for a trunk transfer, that station can return to the original call by bookflashing a second time or can terminate the call by going on-hook.

Also, if the tone receivers 40 for the system are busy, it may not be possible to effect a connection via the local junctor 95. In this case, by busy tone status 11 (block B13) is placed in the local junctor status memory and three alternatives are available to the transferring PABX station: to stop dialing, to hookflash, or to go on-hook. If (during the busy tone status 11) the transferring station line goes on-hook, the system goes into a recall original line status which is indicated by transfer busy test status 25 (block B14). If the transferring station hookflashes, also indicating a desire to return to the original call, the local junctor 95 is free (block B10) and the call is ransferred to the original trunk junctor 95 and trunk call in progress status 13 is placed in the status memory (block B1). If the transferring PABX station does nothing, a 30 second lockout circuit frees the local junctor 95 (block B10) and the call remains uncompleted until the transferring PABX station either goes on-hook or hookflashes.

During status 2 and 3 (block B4) in the local junctor or during the dialing operation the transferring party may desire to terminate the call or to return to the original call. Again a 30 second lockout to the local junctor 95 is provided and a return to the original call (block B1) can be established by a second hookflash at the transferring station. However, if the transferring PABX station returns on-hook, the recall subgroup initiated by transfer test status 25 (block B14) is indicated. If, during the dialing function (block B4), all local junctors in the system are busy, the busy tone status 11 is placed in the local junctor status memory and the transferring PABX station receives busy tone. If, during the busy test (block B5) of the local junctor (status 4), the line is busy again, a busy tone status 11 is placed in the local junctor status memory. The transferring PABX station then may either return to the original call or terminate that call. During the call waiting status 10 (block B7) or ringing status 5 (block B6), the transferring PABX station may return to the original call (block B1) by a hookflash or may terminate the call (during call waiting status 10) by going on-hook. However, if the calling station goes on-hook while the transferee station is being rung the transfer function is processed and the transferee station is connected as described above.

If the transferring party wishes to talk to the transferee party he may remain off-hook during ringing (block B6), and when the transferee station answers the local junctor will progress to a local call (status 7 in block B15) and the local parties may initiate a discussion before the trunk (or transferred) party is connected. If, while this local call is in progress, either the transferee line or the transferring line goes on-hook, the local junctor 95 is released (block B10) and the transferring PABX station is returned to the original trunk junctor and a trunk call in progress status 13 (block B1) is placed in the junctor status memory.

If the transferring party (during the local call in progress status 7 in block B15) wishes to effect a special three-way conference connection, he may depress his hookswitch. The hookflash forwards the transferring and transferee statuses to the trunk junctor memory and a status 37 (block B16) is initiated to provide a conference call for all parties connected. If, however, the trunk has been released by this time, the hookflash does not affect the local call in progress (status 7 in block B15) in the system.

During the three-way conference connecting the transferring and transferee stations and the transferred trunk party may consult or confer with one another. The conference connection is terminated if either caller or called party (both stored in the trunk junctor memory) goes on-hook and the trunk status returns to the trunk call in progress status 13 (block B9). After the transferee party has been connected the transferring party may simply hookflash to eliminate the transferee party from the conversation and the call progresses to status 13 (block B9).

As described above, a special recall loop is provided when either the transferee party does not answer after 30 seconds (during status 23 transfer ring party B), or when the transferring line has gone on-hook during the busy tone status 11 or during dialing status 2 and 3. Thus, a transfer busy test status 25 (block B14) is placed in the trunk junctor and the arrangement subsequently searches the ING and ED memory to test the busy-idle status of the transferring PABX line. If the transferring line still remains on-hook and the transferee party has not answered after 30 seconds of ringing, a re-ring party A status 26 (block B17) is placed in the trunk junctor providing a status memory ringing signal to the transferring PABX station.

If the original transferring PABX party answers, the system again places the transferring and transferred trunk party in a trunk call in progress status 13 (block B1). If, however, during the transfer busy test status 25 (block B14) or during the re-ring party A status 26 (block B17), the transferring line is busy or the transferring line does not answer within 30 seconds, a recall busy test status 18 (block B18) is placed in the trunk junctor status memory.

Subsequently, the recall busy test status 18 provides for a call diversion to an attendant's line or to a designated station previously programmed as a special feature. If the attendant line was the line that was called orginally (transferring PABX station) and the attendant line is idle, the trunk junctor is placed into a ringing attendant status 19 (block B19) and the call proceeds to a trunk call in progress status 13 (block B20) when the attendant answers. If the attendant line is the transferee line and it is busy, a recall waiting status 20 (block B21) is placed in the trunk junctor and the status is alternated between the recall waiting status and busy test status 18 until the attendant line becomes idle and then the system progresses to the ringing attendant status 19 (block B19).

If the transferee line is not the attendant line, then the system diverts the call to the attendant line in a busy test status 4 (block B22). If the attendant line is free, the system proceeds to a ringing status 5 (block B23) and, when the station attendant answers, to the trunk call in progress status 13 (block B20). If the attendant line is busy when the system is placed in the busy test status 4 (block B22), the system will go into call waiting status 10 (block B24) and periodically check the busy-idle status of the attendant line. When the attendant line becomes free, the ringing status 5 (block B23) is placed in the trunk junctor status memory and the call preceeds as described above. However, if after 30 seconds of ringing there is no answer at the attendant's line, the pre-programmed number of the designated station is placed in the trunk junctor memory. A busy test is now preferred on the pre-programmed number (block B25) and, if it is idle, that station is rung (block B26). The trunk call in progress status 13 (block B27) is forwarded to the trunk junctor when the designated station goes off-hook. If the designated station is busy, the call waiting status 10 (block B28) causes alternation between the busy test status and the call waiting status. In all of the trunk call progress status 13, the called line going on-hook produces a trunk release 16 (block B16) and a status O (block B12) indicating the trunk is free to be seized for subsequent connection.

Figure 7A:
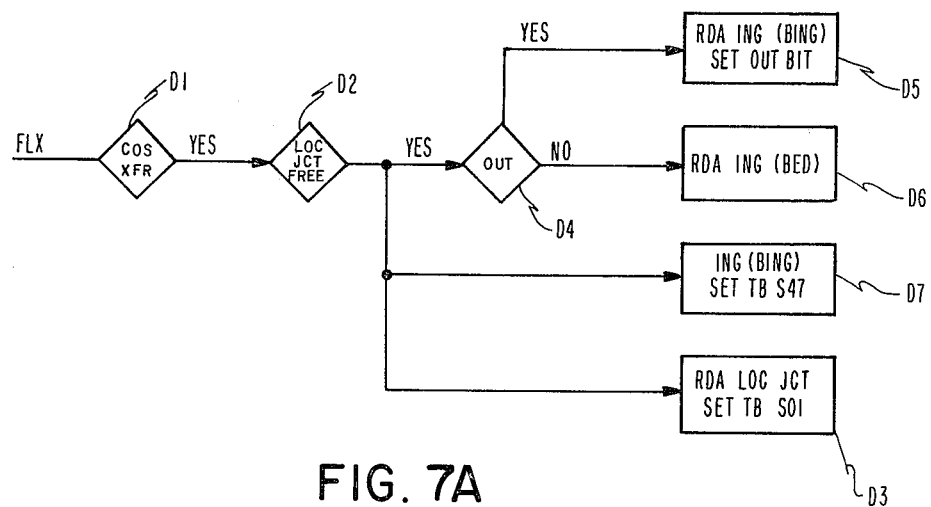
FIGS. 7A–L are the decisional sequences performed during the status progression in FIG. 6.

The basic flow chart of the trunk transfer operation will now be more fully described by reference to the functional diagrams 7A–K which illustrate the progress from one state to the next of the flow chart and by reference to schematic logic diagrams 8A–D which implement the functions shown in the flow chart. FIG. 7A shows the progress of a call from trunk call in progress (status 13) to trunk transfer hold (status 47) in the trunk junctor, the seizure of a local junctor 95 and the subsequent placing of an initial off-hook status 1 therein.

The system initiates an FLX signal, which indicates there has been a hookflash from a transferring PABX station connected to a trunk junctor in status 13. The line circuit associated with the transferring station is then checked to see if it has a class-of-service available for transfer (COS XFR), and if so, the system seizes a local junctor 95. Once a free local junctor is found (LOC JCT FREE in D2), the system progresses from addressing the trunk junctor and random accessing the local junctor seized to set a transfer bit in the memory allocated to the local junctor (block D3).

An initial off-hook status, SO1, is also written then status portion of the junctor memory (block D3). The system then determines whether an out bit has been set (block D4). The absence or presence of the out bit indicates whether the original trunk call that initiated the trunk transfer function was an incoming trunk call or outgoing trunk call, respectively.

If the indication is that the call is an outgoing trunk call (Yes in D4) the calling number stored in the ING and ED memory is placed in the ING portion of the memory relating to the local junctor and the out bit is set (block D5). The PABX station (transferring party) is recognized as the calling party in the trunk junctor and it is also the calling party in the local junctor effecting the connection of the transferee station.

If the trunk call was an incoming call (No in D4) the transferring PABX station had its number stored in the ED portion of the ING and ED memory and therefore, when the transferring PABX station becomes the calling party in the local junctor, the transferring party must have its number placed in the ING portion of the ING and ED memory associated with the local junctor. This is effected by a command: "Take the number stored in the ED portion of the buffer and place it in the ING portion of the memory associated with the local junctor" (block D6). The system now reverts back to the trunk junctor (block D7) and restores the calling number from the ING portion of the buffer back in the ING portion of the junctor memory, sets the transfer bit (SER TB), and also places a status 47 in the memory portion associated with the trunk junctor.

Figure 8A:
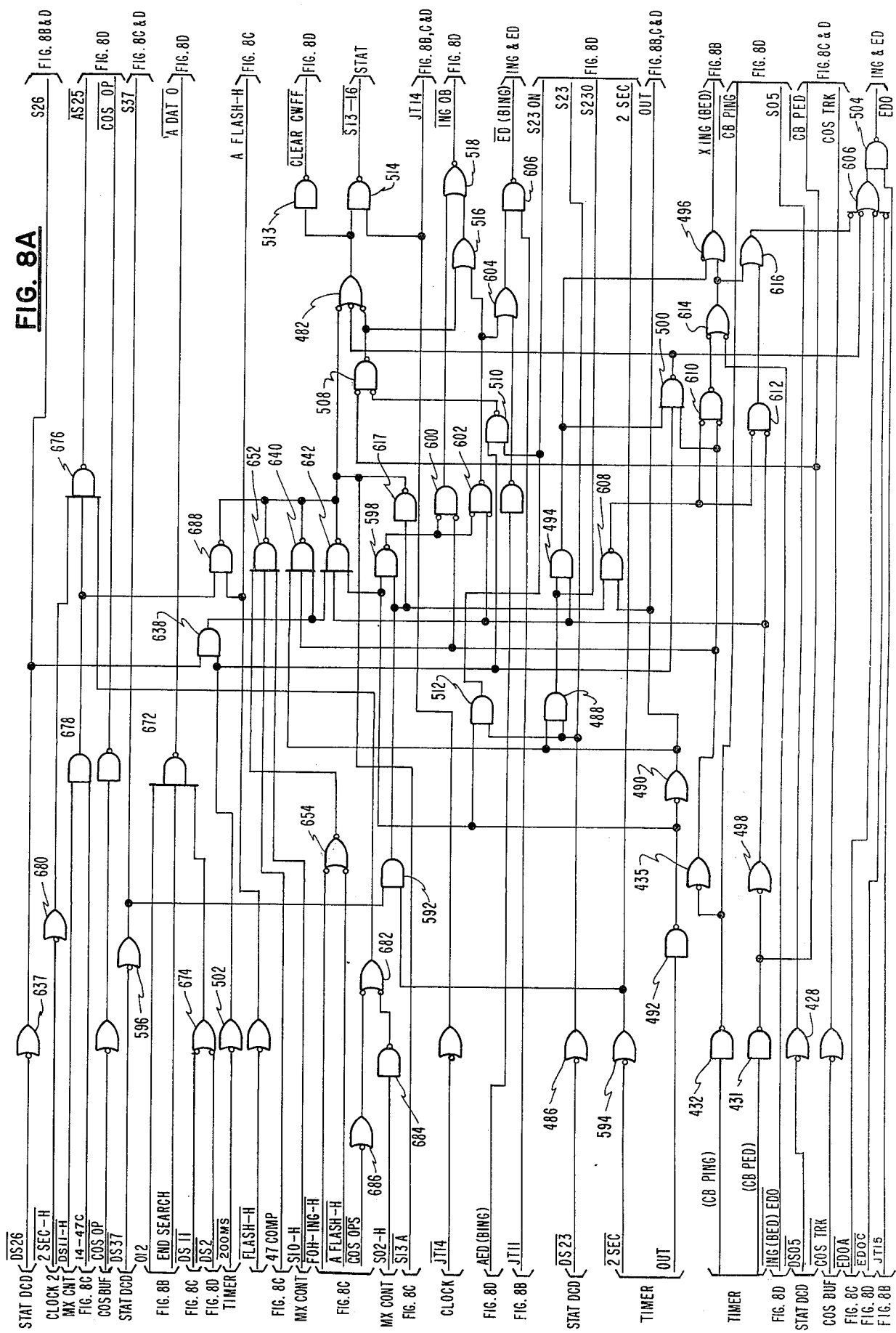
Figure 8B:
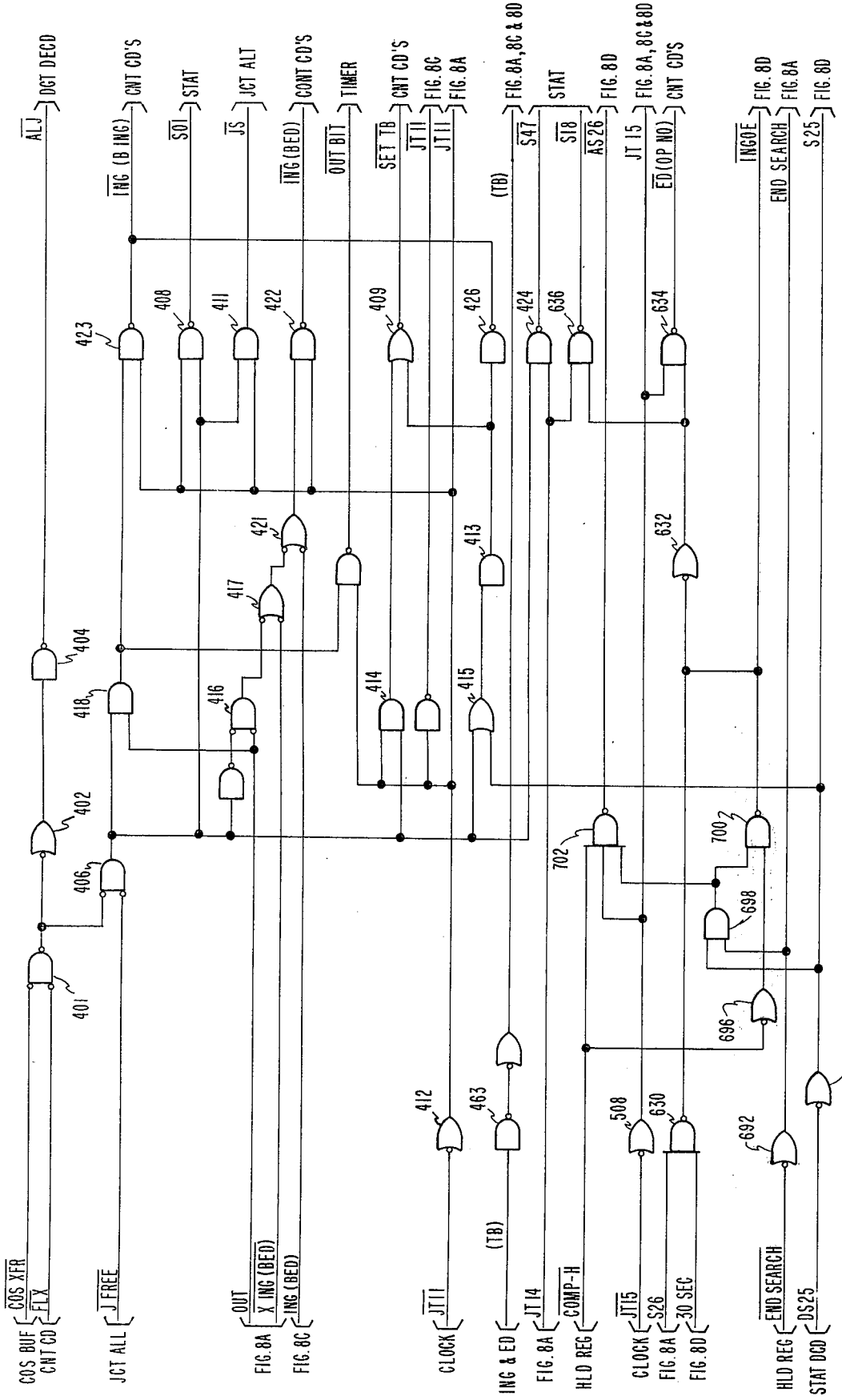

These functions illustrated in FIG. 7A are implemented by the logic circuitry shown in FIG. 8B in which the AND gate 401 combines the class-of-service transfer signal COS XFR with the FLX signal to produce a request for a local junctor via gates 402, 404. The output signal ALJ, which is transmitted to the digit decoder 150 requests the junctor allotter to find a local junctor 95 that is free and to seize the free local junctor for the transfer function. When the idle local junctor is found, the junctor allotter transmits a J FREE signal to an AND gate 406 which is combined by the gate 406 with the output of the gate 401. A high output signal from the gate 406 is the enabling signal for the remainder of the sequence illustrated in FIG. 7A. The local junctor 95 is selected when an AND gate 411 is enabled by a high output of the gate 406 during junctor time slot 11 (JT11) which is transmitted via gate 412. The JS output signal transmitted by the gate 411 to the junctor allotter selects the local junctor for the forwarding of certain information to be stored therein and for further processing.

Simultaneously, the transfer bit is set via a signal SET TB transmitted via a gate 412 and a gate 414 during the same junctor time slot 11. The output of the gate 406 and junctor time slot 11 signal enables an AND gate 408 which transmits a signal SO1 to the status memory, thereby storing an initial off-hook status of 1 for the local junctor 95. An AND gate 416 is used to test whether an out bit has been set (signifying that an outgoing trunk call originated the transfer) and, if it has not, transmits a signal ING (B ED) to the control circuits via gates 422, 421 and 417 during the junctor time slot 11. If the trunk call was an outgoing call, the gate 418 is enabled by the output signal from the gate 406 and by the signal OUT and transmits a signal ING (B ING) via the gate 421 (which is enabled at junctor time slot 11) to the control circuits, thereby storing the calling number in the ING portion of the local junctor memory.

The junctor select signal JS is disabled after junctor time slot 11 and the remaining time slots in the junctor period are allocated to the trunk junctor. At junctor time slot 14, the transfer bit is set by a signal SET TB transmitted via gates 412, 413 and 415. The output signal from the gate 413 is also inverted by a gate 426 and provides the signal ING (B ING), again storing the ING portion of the buffer into the ING portion of the ING and ED memory associated with the trunk junctor. Further during the junctor time slot 14, a status 47 is stored in the status memory associated with the trunk junctor via gate 424 (enabled by gate 406), by a signal S47.

Figure 7B:
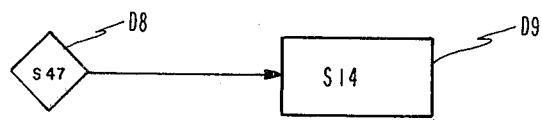

As can be seen in FIG. 7B, the system treats the status 47 (block D8) of the trunk junctor as a regulator trunk status hold 14 (block D9) and no further circuitry is required to hold the outside calls connected to the trunk for transfer. The call now progresses as would a local call, going through dialing (statuses 2 and 3) and busy test (status 4) and call waiting or ringing.

Figure 7C:
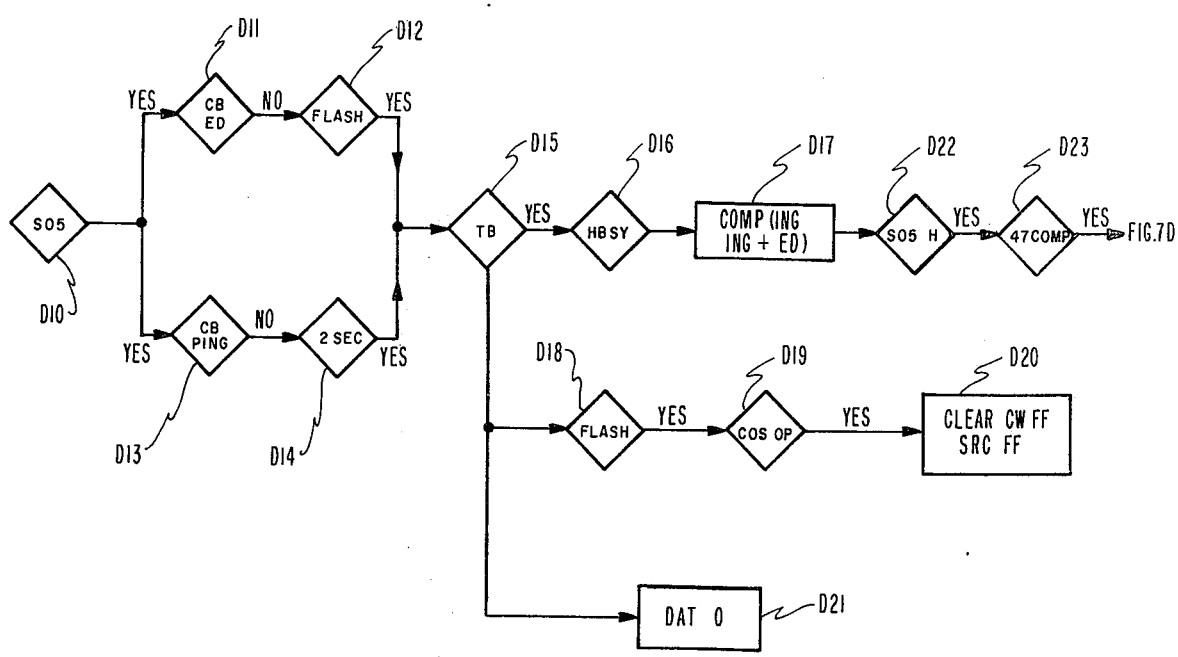
Figure 7D:
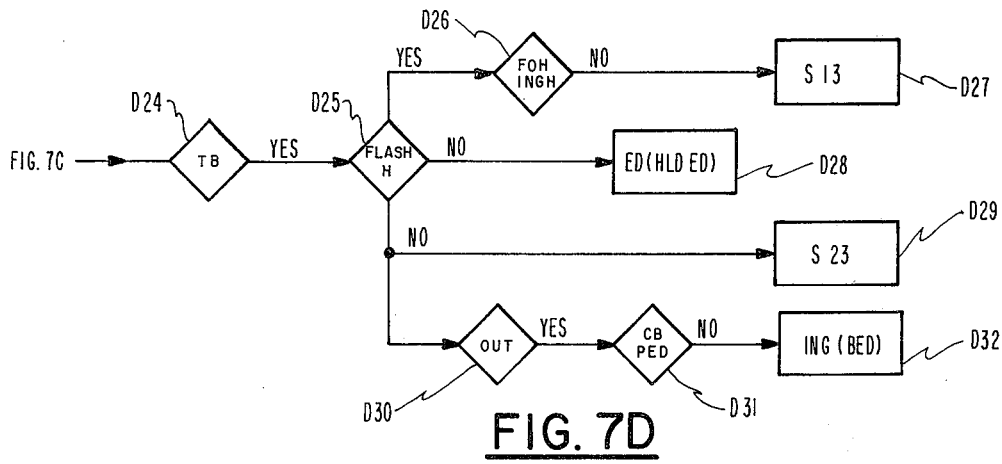

FIGS. 7C and 7D illustrate the progress of the system from the ringing status 5 to a transfer ring party B, status 23, or to the trunk call in progress, status 13. During the ringing from the local junctor 95, the transferring PABX party (which is the calling station) has three choices: he can wait until the ED party (transferee PABX station) answers and be connected as in a local call having status 7, he can hookflash to return to the original trunk call, or he may go on-hook and complete the transfer operation. If the calling party wishes to progress to a local call in progress (status 7), no further circuitry within the transfer circuit is required and the call is handled from common circuitry in the PABX system, however, the transfer circuit tests for a hookflash or an on-hook during ringing status 5 (block D10) by checking if the CB relay is set for the calling or called party (blocks D11 and D13). The signals CB PED and CB PING (FIG. 8A) indicating that the transferring PABX station has gone on-hook. The system then determines whether there was a hookflash (block D12) or an actual on-hook signal given (block D14).

To register an on-hook signal the transferring PABX station must operate the CB relay for longer than 2 seconds. If either a hookflash or an on-hook signal has occured the system then interrogates the memory to see if the transfer bit was set in D15, and if so, makes a hold register search for the trunk junctor to which the call will be transferred. If the hold register is not busy (block D16), the signal COMP (ING ING+ED) compares (block D17) the calling number to all the ING and ED numbers and ED numbers in the memory and, when the trunk junctor having the calling number is found, the connection to the transferree station will be completed. If, during this time, a hookflash (block D18) has occurred and the transferring line has a class-of-service operator (COS OP) in D19, thereby allowing the line to signal the operator with the hookflash, a call waiting flip-flop and a SCR flip-flop are cleared (block D20) to allow the transfer function to proceed without involving an attendant. In addition, a data zero (DAT 0) signal (block D21) is given to the local junctor 95 to clear it of information and thereby release the local junctor 95 for subsequent connection.

The PABX system now requests whether the condition which caused the hold register search was initiated during status 5 by transmitting an SO5-H signal (block D22) and, if the answer is affirmative, checks whether the trunk junctor found during the search has a trunk transfer hold status 47 by transmitting a signal 47 COMP (block D23). If the trunk junctor has the status 47, the system continues to interrogate whether the transfer bit is set in the memory of the trunk junctor in D24 (FIG. 7D).

The logical decision of whether the hookflash of the calling party caused the hold register search is now made (block D25) and, if so, (indicating the calling party wishes to return to the original trunk call), a final on-hook signal (block D26) is tested and the junctor returned to the status 13 (block D27). However, if a hookflash did not initiate the hold register search, the connection of the trunk party to the transferee station is indicated and, therefore, the number contained in the called portion of the hold register (the transferee party) is placed in the called portion of the trunk junctor memory (block D28) to indicate that this call was registered as an incoming trunk call. However, if the original call was an outgoing trunk call, the out bit is tested and is found (block D30). The CB relay is again tested (block D31) and if the called party is still off-hook, the buffer ED (transferee PABX station) number is placed in the ING portion of the memory of the trunk junctor (block D32). The trunk junctor is given a new status (23) simultaneously therewith (block D32). The switching of the numbers stored in the memory permits the transferee party tp replace the transferring station in the trunk junctor while retaining the indication of an outgoing or incoming call. The implementation of these operations begins with the decoding by an OR gate 428 of the signal DSO5 (FIG. 8A) transmitted from the status decoder 150. The signal DSO5 indicates the local junctor is in a ringing status 5 function. The gates 431 and 432 decode the CB PING and CP PED signals (indicating whether the calling bridge relay indicates that the transferring and transferred stations are on or off-hook) transmitted from the timer circuit. The CB PING signal and a two signal (2 SEC) are combined (FIG. 8D) in an AND gate 434 and the output of the gate 434 and a flash signal (FLASH) define input signals to an OR gate 436. The output signal from the gate 436, the class-of-service trunk signal COS TRK and the hold register busy signal HBSY define the inputs to an AND gate 438. If the hold register is not busy, the gate 438 is enabled and its output signal inverted by a gate 441 defines one input signal to an AND gate 442 which combines the transfer bit signal TB and the status 5 signal SO5.

The output signal from the gate 442 then provides a signal indicating the transfer function should take place and a hold register search started. This command is transmitted by the gate 442 as a request to compare the calling number with all ING and ED numbers in the junctor memory to find the particular trunk junctor that is on hold. The comparison signal, COMP (ING ING+ED), is transmitted from the gate 442 via gates 448 and 456. The output signal of the gate 442 is also combined in an AND gate 444 with the signals class-of-service operator (COS OP) and the signal FLASH (in gates 445 and 447) to provide an indication that the call waiting flip-flop and the SCR flip-flop should be cleared. The CW and SRC flip-flops are cleared by the signals CLEAR CWFF and CLEAR SCRFF which are transmitted via gates 458 and 460, respectively.

The system now performs a comparison to locate the trunk junctor that is holding the transferred party. If there is a transfer bit set, the hold register search was begun in status 5, and the trunk junctor found by the comparison also contains a status 47 an AND gate 466 (FIG. 8C) is enabled. The output signal from the gate 466 decodes the incidence of a signal O12 from the ING and ED memory (FIG. 8B), which indicates that a transfer bit has been set for the trunk junctor. This input is transmitted to the gate 466 via gates 463 and 465 (FIG. 8B). The remaining input to the gate 466 which is transmitted via gates 462, 464 and 465 is the coincidence of a status SO5-H signal and a 47 COMP signal. This signal then indicates that the correct trunk junctor has been found and the transfer function should progress further.

When the hold register search is initiated by a hookflash (indicating that the transferring PABX party wishes to go back to the original call), an AND gate 477 transmits an output signal to one input of an AND gate 478. The AND gate 477 is enabled by the coincidence of the A FLASH-H signal, indicating the hold register search was begun with a flash, and the enabled output of gate 466. A final on-hook status signal for the calling party (FOH-ING-H) is then decoded via gates 485, 479, 478 and 481 and the signal is inverted in gate 481 to produce a status 13 signal S13A. The status 13A signal is inverted by OR gate 482 (FIG. 8A) and a S13-16 signal is transmitted from the gate 482 to the status circuit. The trunk junctor is then returned to the original status 13 connecting the transferring party to the original trunk caller.

If, on the other hand, the gate 470 detects that there was no hookflash, a gate 468 provides an output signal which is transmitted via gates 472, 474 and 476 and indicates that the number stored in the ED portion of the hold register should be transferred to the ED portion of the ING and ED memory relating to the trunk junctor. The call is processed as an incoming trunk call and the signal which provides the storage is ED (H-ED), the output signal of a gate 476. At the same time the output of the gate 468 is combined with a junctor time slot 14 by a gate 483 and the output signal (S32–24) to the status circuit produces a storage of the status 23 in the trunk junctor.

If the call is an outgoing call, gates 482 and 484 decode the inversion of the out bit with the signals transmitted from gate 468 and the CB relay of the called party (CB PING). The gate 484 then produces an output signal, ING (B ED), which is a command to store the buffer ED number into the ING portion of the ING and ED memory associated with the junctor processing the call.

When the call is in status 23 (block D34 in FIG. 7E), the system proceeds to status 5 — ringing the transferee party from the trunk junctor. The ringing is provided as a common feature of the system and no transfer circuit control is needed. At the same time the timer is started (block D44) and begins to time the duration of the ringing of the transferee party.

When the transferee party answers, and if the call is not an outgoing call (in other words it is an incoming trunk call — block D35), the system checks if the transferee party has been off-hook for at least 200 milliseconds (block D36) and checks whether it is the called party that has been off-hook (CB ED in block D37). Since the number of the transferee station is now stored in the called position of the junctor memory and the trunk junctor is connected, a status 13 is placed in the status circuit associated with the particular trunk junctor and the call waiting (CW) flip-flop is cleared (block D38). Since the number in the calling position of the junctor is no longer required an ING O signal is generated to erase the calling number and the call transfer function for an incoming call is completed.

If the transfer is originated during an outgoing call (Yes in block D35), the CB relay is checked (block D39) to see if the transferee station has been off-hook for 200 milliseconds (block D41) and whether the called number in the buffer is stored in the ING portion of the ING and ED memory. The trunk junctor now has the called party from the local junctor (i.e., the number of the transferee station is stored in the ING portion of the memory). The system now waits for the CB PING signal (block D42) which indicates the setting of the calling bridge relay of the ING party which was recently stored.

When the CB PING signal is received, the system erases the ED portion of memory, stores a status 13 in the status circuit memory and clears the call waiting flip-flop (block D43). Alternatively, if the transferee party has not answered after 30 seconds, the transferring party is recalled and is connected to the trunk junctor. During status 23 the timer is started (block D44) and, if the transferee party does not answer after 30 seconds (block D45) and the CP display, CW flip-flop and the SRC flip-flop are cleared (blocks D46 and D47, respectively). The system then interrogates whether the call is incoming or an outgoing trunk call (block D46). If the call is an outgoing trunk call, the number in the called portion of the memory is returned to zero by erasing the transferee party's number and a status 23 (block D50) is stored in the status memory, indicating that a transfer busy test is to take place during the next time access of the trunk junctor.

If the call is an incoming trunk call, the answer in D49 is negative and the system then checks for the presence of a universal night answer bit (block 49) in the digit decoder of the bit is not present, the ING number in the memory is zeroed and the buffer ING number is stored into the called position of the junctor memory (block D52). A status 25 is also placed into the status memory associated with the trunk junctor (block D52). The universal night answer feature allows the call to be diverted to a night attendant, and if the bit is set (Yes in block D49) the system zeroes the ED portion of the memory and stores the buffer ED number into the ING portion of the junctor memory and the system progresses to a status 5 to ring the universal night attendant (block D51).

Figure 7E:
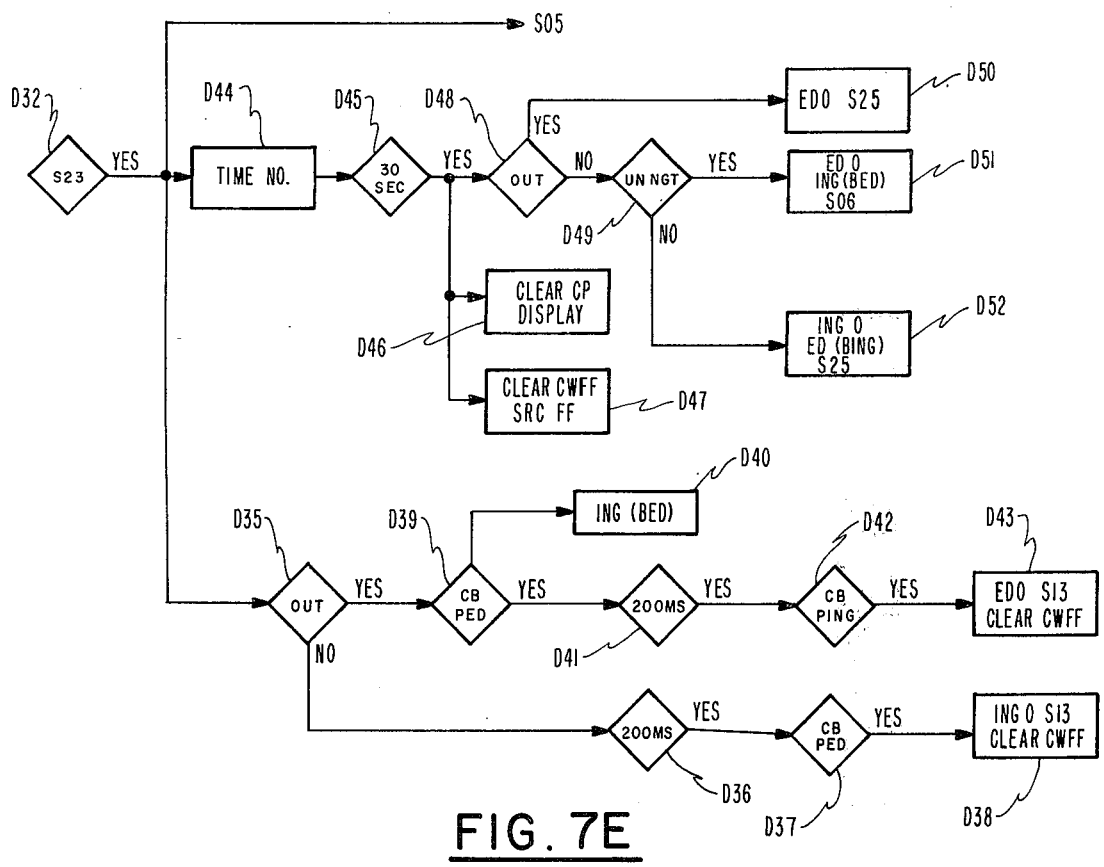

These functions illustrated in FIG. 7E are implemented in logic circuitry shown in FIG. 8A. A high output signal from a gate 488 indicates that an out bit is present (signal OUT) and the system is in a status 23 (inverted in gate 486). The output of the gate 488 is transmitted to a gate 494 which combines the signal CB PED transmitted via gates 431 and 498 to generate a signal X ING (B ED), from a gate 496 that stores the number present in the ED portion of the buffer into the ING portion of the memory. The system next checks to see if the called party has been off-hook for 200 milliseconds in a gate 500 which is enabled by a high output from gate 494. The signal 20ms is transmitted via gate 502 and the CB PING signal is transmitted via gates 432 and 435 to gate 500 to provide this indication. The output signal from gate 500 produces a status 13 signal (S13–16) by combining signals transmitted via gates 482 and 514 during JT14 and also clears the ED portion of the memory by a signal EDO transmitted via gates 506 and 504. At this time the CW flip-flop is cleared by the output signal from the gate 500 which is transmitted via gates 513 and 482 producing a signal CLEAR CWFF.

If the call is an incoming trunk call, the output signal from a gate 512 (FIG. 8A) indicates that the output bit is not set (detected via gate 492) and the system is in status 23 (detected via gate 486). This output signal from gate 512 is combined with the 200 millisecond signal, 20ms, transmitted from the gate 502 in a gate 510 to detect the coincidence of those signals. If the called party is still off-hook (signal CB PED) the signals transmitted via gates 431, 508, and 482 enable gates 514 and 513.

The signal CLEAR CWFF is transmitted from the gate 513 and the status signal S13–16 is transmitted from the gate 514 during junctor time slot 14. The signal ING O, which clears the ING portion of the memory is transmitted from a gate 518 (when gates 516 and 508 are enabled), when the transferee party answers the call.

If the transferee party does not answer, the system remains in status 23 and ringing continues. The system transmits a start timing signal TIM NO (FIG. 8D) to the timer via gates 520 and 522 when the S53 signal is present. The timer runs for 30 seconds and if the transferee station has not answered, transmits a signal 30 SEC via a gate 524.

The system then clears the CP display by transmitting a signal CP CLEAR via gates 526 and 528 which decode the coincidence of the 30 SEC signal and the S23 signal. The output signal from the gate 528 also enables gates 458, 460 and 466 to transmit signals CLEAR CWFF and CLEAR SCRFF, respectively, to clear the CW and SRC flip-flops. The transfer busy test status 25 is used to recall the transferring party and the system checks whether the call is an incoming or outgoing call. If the trunk call is an incoming call, a gate 530 is enabled by the 30 SEC and S23ON signals (FIG. 8A) transmitted via gate 512. If the universal night answer bit is present, gates 532 and 534 are enabled.

A high output signal from the gate 534 enables a gate 536 during junctor time slot 14 and permits changing the status of junctor into universal night answer status 6. In addition, the high output signal from the gate 534 is inverted by a gate 538 which produces two signals EDO (which zeros the called portion of the junctor memory) and ING (B ED) (which stores the ED portion of the buffer into the ING portion of the junctor memory). If the unversal night answer bit is not present, a gate 540 is enabled by the signal $\overline{\text{UN NGT}}$ and the output signal of the gate 530 and clears the ING portion of memory by signal ING O transmitted via a gate 544 during junctor time slot 14.

The output signal from the gate 540 also utilized as a signal A ED I (B ING) which stores the number in the ING portion of the buffer into the called portion of the junctor memory. Further, when the gate 540 is enabled during junctor time slot 14, a gate 548 is enabed via gate 546 to generate the status signal 25.

If, on the other hand, the original call is an outgoing trunk call, the 30 SEC signal and the S23ON signal (FIG. 8A) enables an AND gate 550 which produces an ED OC signal (via a gate 552) for clearing the ED portion of memory and generate the status 25 signal S25-26 (via gates 554, 546 and 548) during junctor time slot 14. This completes the normal logic paths for the logic transfer function.

In the PABX system additional auxiliary paths are provided. For example, as a special feature, the system may permit the transferring party to remain connected in the call until the transferee party answers and then to go into a normal connection with the transferee party. This special feature allows the transferring party then to establish a three-way conference by a hookflash which places the connected trunk junctor into a three-way conference transfer status 37.

Figure 7F:
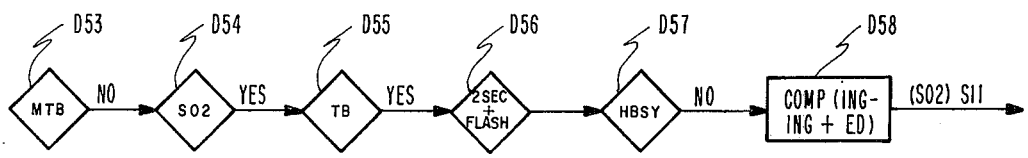
Figure 7G:
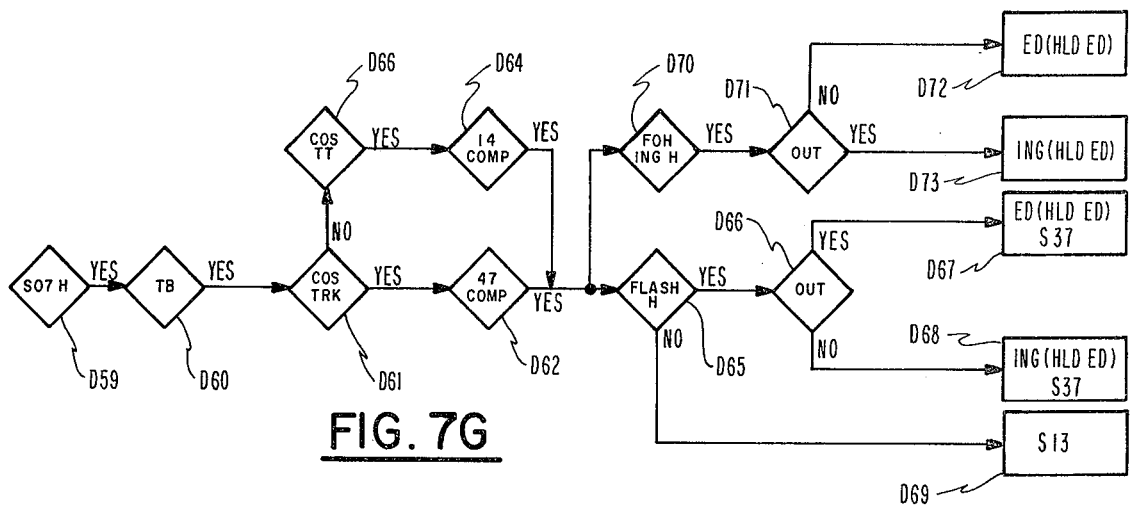

The transition from a status 7, local call in progress, to the three-way conference will now be fully explained with reference to FIG. 7G. With the system in a status 7, a hookflash by the transferring party causes a hold register search (for the trunk junctor which is in trunk transfer hold status 47) to be initiated. The system checks to determine that the hold register search was started in status 7 (block D59) that the trunk junctor found has the transfer bit set (block D60), that the class-of-service trunk indication is positive (block D61) or the class-of-service trunk consultant COSTT is positive (block D63) and that there is either a 14 or 47 status stored in the memory associated with the trunk junctor found by the comparison (blocks D64 and D62, respectively). The system thereafter continues to transfer the call to a three-way conference.

If a hookflash initiated the hold register search (Yes in block D65), the system checks for the presence of an out bit (block D66). An indication that the out bit is set (i.e., that the originating call was an outgoing trunk call) causes the system to store the number of the ED party of the hold register into the Ed portion of the ING and ED memory related to the trunk junctor and store status 37 (block D37). Conversely, if the original call is an incoming trunk call (No in block D68) the the called party number stored in the ED portion of the hold register will be transferred to the ING portion of the junctor memory related to the trunk junctor and a status 37 stored therewith (block D68). This storage places the transferee station number in the position of the junctor memory not occupied by the transferring station number. The conference is now effected by a connection between the trunk party and the two PABX stations via the trunk junctor and closing the two associated crosspoints.

If the hookflash does not initiate the hold register search, a status 13 is placed to a trunk call in progress status which returns the transferee party back to the original trunk call. A final on-hook signal from the calling party (transferring PABX station) is also searched for and if found (Yes in block D70), another check for the presence of the out bit is made (block D71). If the call is an outgoing call, the number stored in the ED portion of the hold register is then stored into the ING portion of the ING and ED memory (block D73) or, alternatively, is stored in the ED portion of the ING and ED memory of trunk junctor (block D72) since an incoming trunk call is indicated. Thus, if the transferring party goes on-hook during the local call in progress status 7, the transferee party is connected to the transferred party at the original trunk junctor.

The functional diagram 7G is implemented by the logic circuitry shown in FIG. 8C. An AND gate 556 is enabled by the coincidence of the signals TB (indicating the presence of the transfer bit, SO7-H (indicating the hold register search was initiated in status 7), COS TRK (indicating that the called line has a trunk class-of-service), and 47 COMP transmitted via gates 465 and 464 indicating that the trunk junctor is in status 47 at the time of comparison. In the event that the 47 COMP signal is not present, the gate 556 may also be enabled (via OR gate 464) when an AND gate 558 is enabled by the coincidence of signals 14 COMP (indicating a status 14 is stored in the trunk junctor memory) and COS TT (indicating a trunk consultation class-of-service).

The output signal from the gate 556 then transmitted to one input of AND gate 558 which combines an $\overline{A}$ $\overline{FLASH-H}$ signal (transmitted to the other input thereof via a gate 470) and the gate 558 when enabled, transmits a status 13 signal S13A (via a gate 562) which returns the trunk junctor to the trunk call in progress status. The output signal of the gate 558 is transmitted via an OR gate 570 to one input of an AND gate 564. If a hookflash is present, the signal A FLASH-H, and an out bit (signal OUT) are present (via gates 566 and 482) the gate 564 is enabled and transmits the status 37 indication (SO4-37 via gates 572 and 544). The output signal from the gate 564 is also transmitted via gates 474 and 476 to produce the ED (H ED) signal during junctor time slot 15. If the out bit, signal OUT, is not set then an AND gate 574 is enabled by the signal transmitted via a gate 582 and the two common inputs with the gate 564, and transmits the status signal SO4-37 (via gates 572 and 544) during junctor time slot 15. The enabled gate 574 also transmits the ING (H ED) signal via gates 576 and 547.

A final on-hook signal FOH ING-H, from the calling party is transmitted via gates 479 and 481 to one inout of an AND gate 560 which is enabled by the output signal from the gate 556. The output signal from the enabled gate 560 enables AND gates 578 and 580. If there is an out bit present, a gate 580 transmits an output signal via gates 576 and 547 during junctor time slot 15 to produce the signal ING (H ED). If an out bit is not present, a gate 578 is enabled and transmits a signal via gates 474 and 476 during junctor time slot 15 to produce a signal ED (H ED). This completes the transition from status 7 to the status 37 or to the trunk call in progress in status 13 for the system.

The progression from the three-way conference status 37 to status 13 will now be more fully described with reference to FIG. 7J. During status 37 (block D116) the transferring and transferee stations are connected in a three-way conference with the trunk party (or transferred station). A three-way connection is accomplished by closing the two crosspoints associated with the PABX stations along the same path as the trunk junctor of the transferred party. The system then checks to see that the associated CB relays are set (block D117) and if either station is or returns on-hook, the timer is started (block D118) to time whether an on-hook signal or a hookflash has been given. If either of these signals is detected the status of the junctor changes to a status 13 indicating a normal trunk call is in progress (block D121).

If the signal detected is a hookflash (block D120), a test is made to determined if the call is an incoming or outgoing trunk call (block D132) and, if the call is outgoing, the ED portion of the memory is zeroed and the called number has a lockout set (block D133). If the call is an incoming call, then the ING portion of the junctor memory is zeroed and the ING lockout is set (block D134). After the transferring station hookflashes for the second time, the trunk call returns back to status 13 and the lockouts are required to prevent the party (transferee station) that is dropped from the conference from interfering. If the transferring party returns on-hook, however, (block D119) and the system detects that the on-hook condition has existed for more than two seconds, then the out bit is tested (block D123) to determine whether an incoming trunk call or an outgoing trunk call is present. If the call is an incoming call and the called party went on-hook (block D128), the ING portion of the memory is zeroed and the information in the ING portion of the buffer stored in the ED portion of the memory (block D129). However, if the calling party returns on-hook (block D130) the ING portion of the memory is zeroed (block D131).

On the other hand, if the call is an outgoing trunk call and the called party has gone on-hook (block D125), the ED portion of the memory is zeroed (block D126). If the calling party returns on-hook (block D127), the ED portion of the memory is zeroed and the ED portion of the buffer is stored in the ING portion of the memory. This action replaces the number of the transferring station with the number of the transferee station and erases the portion of memory in the trunk junctor when the transferring station releases. If the transferee station releases, the junctor memory is erased where that number is stored.

Figure 7H:
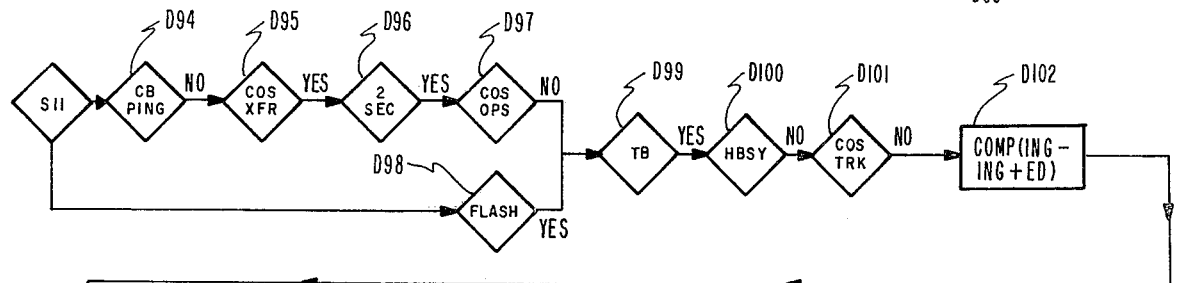
Figure 7H:
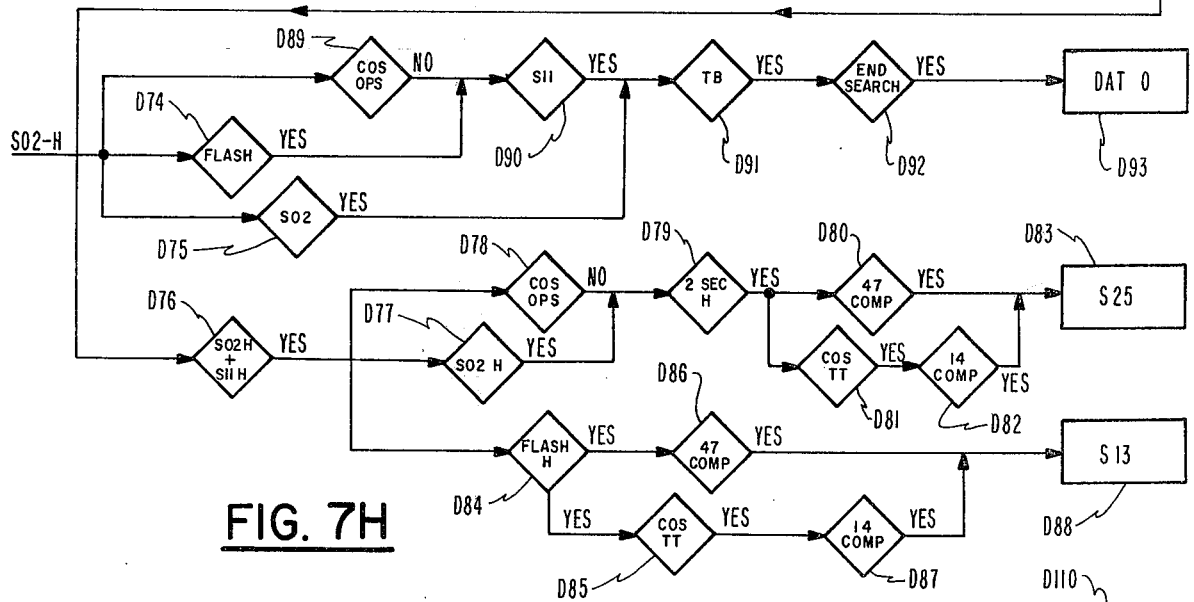
Figure 7I:
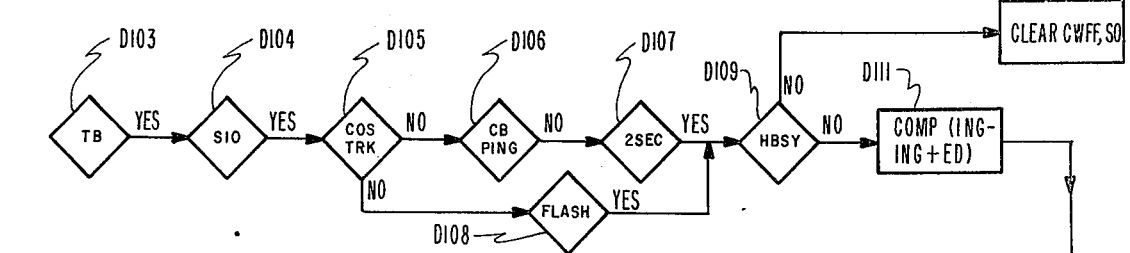
Figure 7J:
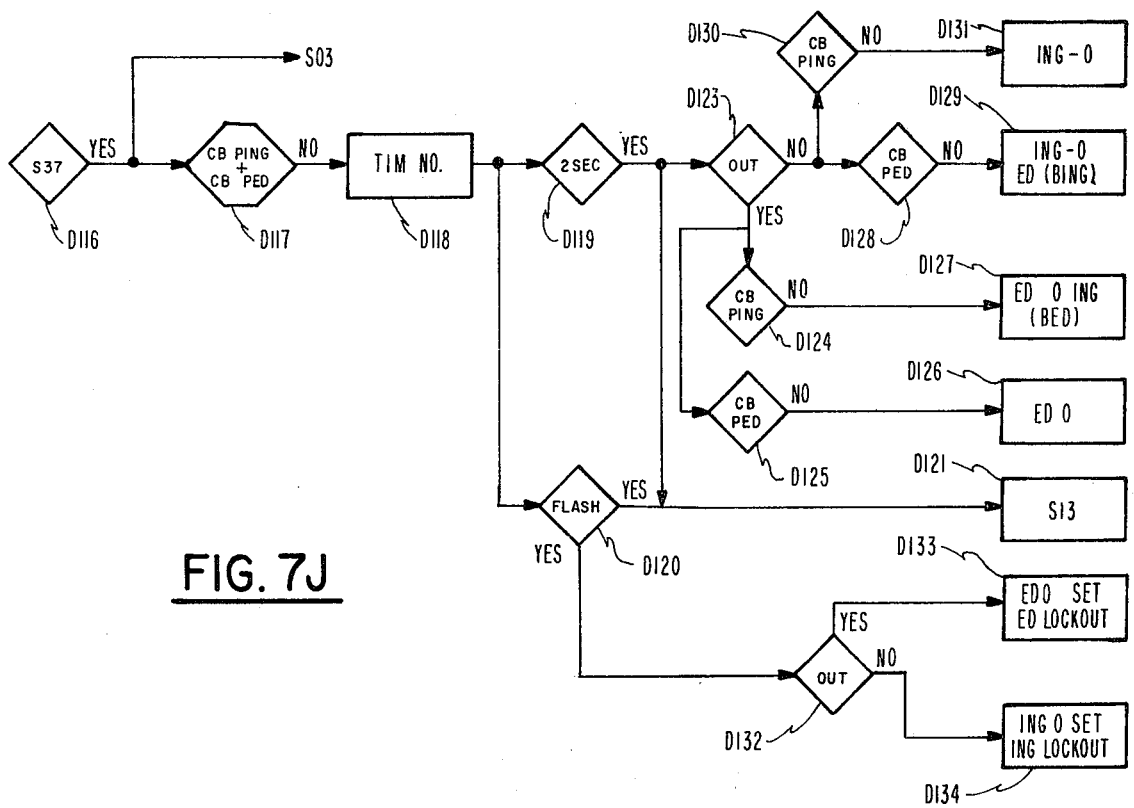

These functions illustrated in FIG. 7J are implemented by the logic circuitry shown in FIGS. 8A and 8D. The signals CB PED and CB PING are transmitted via an OR gate 586 to one input of an AND gate 580 which is enabled by the status 37 signal S37. The output signal of the gate 580 is transmitted via a gate 520 (signal TIM NO) and starts the timer. The timer then times the duration of the on-hook signal, and generates either a FLASH or a TWO SEC signal (FIG. 8A) and the out bit is then tested.

When a 2 second signal (2SEC) is transmitted via a gate 594 (FIG. 8A), an AND gate 592 is enabled by the DS37 signal transmitted via a gate 596. The out bit (transmitted via gate 492) enables an AND gate 598 and the output signal from the gate 598 enables gates 600 and 602. The gate 600 generates a signal via a gate 518 (ING O) which zeroes the ING portion of the memory if the CB PING signal (transmitted via gates 435 and 432) is not present. If the CB PED signal (transmitted via gates 434 and 498) is not present, the gate 602 is enabled and transmits the ING O signal via gates 516 and 518. The output signal from the gate 602 is transmitted (via a gate 604) to one input of an AND gate 606 which is enabled during junctor time slot 11 and generates the signal ED (B ING). This completes the junctor memory for the incoming trunk call when one party of the three-way conference call goes on-hook.

As explained before, the gate 592 is enabled by the coincidence of the status 37 signal and an indication that one of the CB relays has remained on-hook more than two seconds. If the presence of an out bit is detected (via gates 490 and 492) and the gate 592 is enabled, an AND gate 608 is enabled and transmits an enabling signal to one input of each of gates 610 and 612. If no CB PING signal is present the gate 610 transmits (via gates 614, 616 and 606) an output signal to an AND gate 504 which is enabled during junctor time slot 15 has an output signal ED O. In addition, when the gate 610 is enabled, a signal X ING (B ED) is transmitted via gates 496 and 614. If no CB PED signal is present, an AND gate 612 is enabled and transmits an output signal via gates 616 and 506 to the gate 616 which is enabled during junctor time slot 15 and has the output signal ED O. This sequence results in the storage of the station numbers for an outgoing trunk call when one party to the three-way conference goes on-hook.

The output of the gate 592 is also transmitted via gates 617 and 482 to one input of the AND gate 514 which is enabled during junctor time slot 14 and has an output status 13 signal, S13-16.

If, however, the time indicates a hookflash occurred during status 37, the signals S37 and FLASH enable an AND gate 618 (FIG. 8C) and the output signal from the gate 618 is transmitted to one input each of AND gates 620 and 622. The gate 620 is enabled by the out bit signal OUT and, during junctor time slot 8, an AND gate 624 is enabled and transmits the lockout signal X SET via gate 626. The output signal (EDOA) from the gate 620 is also transmitted directly to the circuitry in FIG. 8A which zeroes the called portion of the junctor memory during the time slot 15. If no out bit is present, the output signal from the gate 482 enables the gate 622 which transmits a signal ING O C (to an OR gate 541 in FIG. 8D) to zero the ING portion of the memory. The output signal from the gate 622 enables an AND gate 628 during junctor time slot 11 and the X SET signal is transmitted via a gate 626.

The progression of the system from the ring party A status 26 to either the recall busy test status 18 or back to the original trunk call (status 13) will now be more fully explained by reference to FIG. 7L.

In status 26 the system rings the transferring PABX station (block D145) and sets the time at the start of the status indication (block D146). If the transferring party does not answer within 30 seconds (block D148) the system receives a 30 SEC command to place the operator's number in the called portion of the junctor memory, to zero the ING portion of the junctor memory, and to place a status 18 in the status portion of the junctor memory (block D143). This permits the system to connect to the attendant if the transferring station does not answer.

If the transferring station does not answer, the timer waits until the CB relay has been set more than 200 milliseconds (block D147), thereby ignoring any false off-hook signals. The CB relay and outgoing trunk call bit are logically combined to indicate a match in blocks D150, D151 and D152. The CB PING signal, which indicates the calling line is off-hook, should be set if the out bit is present. CB PED signal, which indicates the called line is off-hook, should be set if the out bit is not present. When the correct match has been verified, the system progresses to the trunk call in progress status 13 (block D153). The functional diagram 7L is implemented by the logic circuitry shown in FIG. 8D.

The status signal S26 is transmitted via gates 522 and 520 to start the timer with the command TIM NO. A gate 630 (FIG. 8B) is enabled by the coincidence of the S26 signal and the reply from the timer, 30 SEC, which indicates the transferring PABX station has been answered in the time alotted. The enabled gate 630 transmits a clear the ING portion of memory signal (ING O E), a store status 18 signal (S18) via gates 532 and 636 during junctor time slot 14, and a store the operator's number (OP NO) via gates 634 and 632 during junctor time slot 15.

If the transferring PABX station answers, a gate 638 (FIG. 8A) is enabled by the coincidence of a status 26 signal, S26, transmitted via a gate 637 and of the timer's indication of an off-hook signal, 200ms, transmitted via a gate 502. The output signal from the gate 638 and the CB relay off-hook indicating signals CB PING (transmitted via gates 432 and 435), CB PED (transmitted via gates 430 and 498), respectively, are combined in gates 640 and 642, respectively, with the outgoing trunk call bit signal OUT (transmitted via gates 490 and 492, respectively). The coincidence of the out bit and the CB PING signal enables the gate 640 which transmits a status 13 signal, S13-16, via gates 514 and 582 to the status portion of the junctor memory. The coincidence of the CB PED signal and the absence of the out bit enables the gate 642 which transmits the status 13 signal S13-16 via gates 482 and 514.

During the call waiting status 10 the transferring PABX station may hookflash or initiate an on-hook signal to indicate the original trunk call should be re-established and the local junctor released. The progression of the system from call waiting status 10 to trunk call in progress 13 is illustrated in functional diagram 7I. If the system is in status 10 than the trunk bit is set (blocks D103 and D104). The system checks to see if the class-of-service trunk is available and, if not, tests (block D105) the timer indication for an on-hook or flash signal. The check for the on-hook relay is to see of the CB PING relay is set (block D106) and, if so, if set for 2 seconds (block D107). Upon finding the on-hook or flash indication (block D108) a hold register search is begun by the system for the trunk junctor connected to the original call (block D109).

During the hold register search the system compares the calling number with the ING and ED numbers in the entire junctor memory (block D111). At this time, the call waiting flip-flop is cleared and the status O stored in the local junctor to release the local junctor (block D116). Once the hold register search is completer, the system initiates an indication whether the final on-hook signal from the calling station or a flash began the hold register search (block D112). Next the system checks (block D113) whether there was a status 47 in the trunk junctor during the preceding comparison and whether the hold register search was begun during the status 10 (block D114). If all these indications are positive, the status 13 is stored in the status portion of the junctor memory and the system proceeds to a trunk call in progress status 13 (block D115).

This functional diagram 7I, is implemented by the logic shown in FIG. 8D. The coincidence of the class-of-service trunk signal COS TRK transmitted via a gate 443, of the hold register busy signal HBSY transmitted via gates 435 and 437, of the flash signal transmitted via a gate 436 and of the 2 second, 2 SEC, and CB PING signals transmitted via gates 434 and 436 and enables an AND gate 438. The output signal from the gate 438 initiates a command to compare the ING with the ING and ED numbers in memory by the gates 456, 448 and 650 when an enabling signal for status 10, DS10, is presented at gate 650. The comparison signal COMP (ING ING+ED) initiates the hold register search for the trunk junctor of the original trunk call.

The output signal from the gate 650 is transmitted via gate 450 to an AND gate 452 which is enabled and transmits a DAT O signal which signals the timer to clear the local junctor during junctor time slots 14 and 15. In addition, the enabled gate 650 generates a clearing signal to the call waiting flip-flop which is transmitted via gates 446 and 558.

Once the comparison in the hold register has been made, the AND gate 652 (FIG. 8A) receives and is enabled by the signals 47 COMP (indicating a 47 was found in the trunk junctor where the comparison was made), the S10-H signal (indicating the hold register search was begun in a status 10 condition), and the output signal from the gate 645 (which indicates the hold register search was begun with a final on-hook signal or a hookflash from the calling party). The output signal from the gate 652 is transmitted via gate 482 and enables gate 514 which generates the status signal S13-16 during junctor time slot 14.

The progression of the system from a transfer busy test 25 to a re-ring party "A" status 26 or to a recall busy test status 18 will now be more fully described with reference to FIG. 7K.

From the transfer busy test status 25 (block D125 in FIG. 7K) the system writes the calling number from the buffer into the ING portion of the junctor memory and sets the transfer bit (block D136). A hold register search is begun (block D137) to determine if the register is idle and the system checks to determine if the call is an incoming or an outgoing trunk call (block D138).

The system searches the ING and ED numbers in memory for a comparison with the calling number (if the transfer call was an initiating outgoing trunk call — block D140) or with the called number (if the transfer call was an initiating incoming trunk call — block D139). When the search has ended (block D141) and the system has found a comparison (block D142), the operator number is placed in the ED portion of the junctor memory, the ING portion is zeroed, and the status changed to recall busy test 18 (block D143). This sequence provides for calling the attendant if the transferring station is busy when the transfer busy test is performed. If the transferring station is idle (no comparison in block D142) the re-ring party A status 26 (block D144) is placed in the status portion of the junctor memory to re-call the transferring station.

Figure 7K:
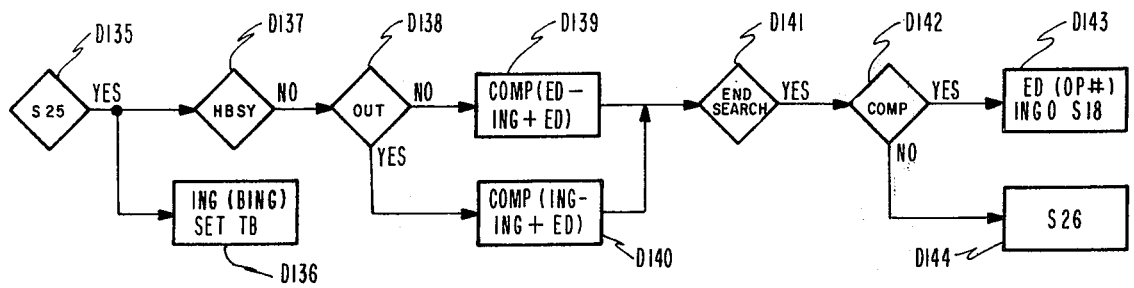
Figure 7L:
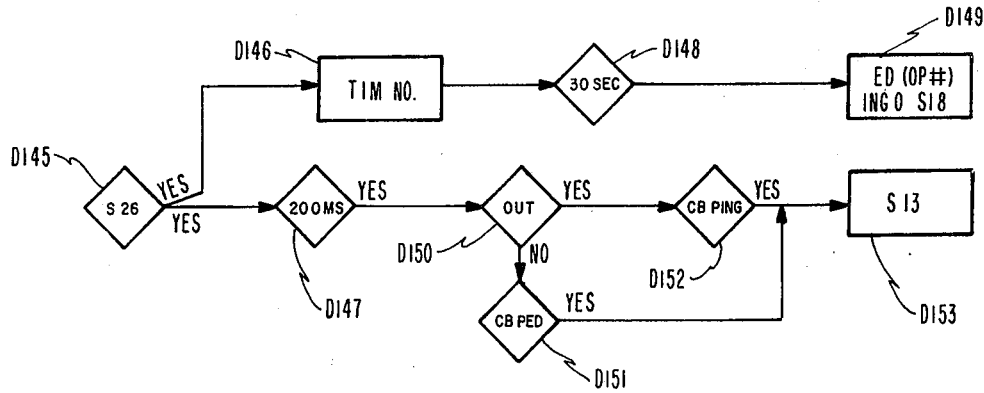

The sequence of events illustrated in FIG. 7K is implemented by the logic circuitry shown in FIG. 8B. An OR gate 694 decodes the status signal DS25 and transmits via gates 415, 413 and 426 the memory command, ING (B ING), to store the calling portion of the buffer in the ING portion of memory. The output signal from the gate 413 is transmitted via an OR gate 409 as a signal SET TB which sets the transfer bit. The preceding sequence prepared the system for a busy test. Referring now to FIG. 8D an AND gate 659 is enabled by the coincidence of the signal $\overline{HBSY}$ (transmitted via gates 435 and 437) and a signal S25 which indicates that the transferring number can be searched for since the hold register is not busy. If an out bit is present an AND gate 663 is enabled by the output signal from the gate 659. Alternatively, if the call was an incoming trunk call an AND gate 661 is enabled by the output signal from th gate 659 and the signal $\overline{A\ OUT}$ transmitted from the gate 482 (FIG. 8C). The output signal from the gate 661 and the output signal from the gate 663 (transmitted via the gates 448 and 456), respectively, are the comparison commands COMP (ED—ING+ED) and COMP (ING—ING+ED) to the hold register.

When the search has ended, a signal END SEARCH transmitted from the hold register enables an AND gate 698 (FIG. 8B). The output signal from the gate 698 transmitted to one input of each of AND gates 702 and 700. If a comparison is found, the gate 700 is enabled by the comparison signal, COMP-H, transmitted via a gate 696. The output signal from the gate 700 is transmitted as the signal ING O E which zeroes the ING portion of memory. The same output signal is transmitted via gates 632 and 634 as the signal ED (OP NO) which initiates storage of the operator's number during junctor time slot 15, and is transmitted gates 632 and 636 as the signal S18 which initiates storage of the status signal during junctor time slot 14.

If no comparison is made, an AND gate 702 is enabled and generates the status signal AS26 during junctor time slot 15.

The progression from the dial status 2 or 3 to the busy tone status 11 and either to the trunk call in progress status 13 or to the transfer busy status 25 will now be more fully explained with reference to the functional diagrams 7F and 7H.

The system checks for the MTB bit (block D52 in FIG. 7F) the presence of which indicates a local transfer and, if the MTB bit is not set, checks for the status 2 indication (block D54) and for the transfer bit indication (block D55). The system then checks if the 2 second or hookflash indication is set (block D56), which indicates that the transferring party has gone on-hook or hookflashed. If either indication is present a hold register search is initiated (block D57), since the transferring party is indicating that the original call should be re-established. If the hold register is not busy, the ING number is compared to all ING and ED numbers in the junctor memory to find the trunk junctor connected to the original trunk caller (block D58).

Referring now to FIG. 7H, the system is tested for a status 2 (block D75), for the presence of a transfer bit (block D91) and for an indication that the hold register has ended its search (block D92). If three checks are positive, the system transmits the data O signal (block D93) to release the local junctor. In addition, the indication that the hold register search was started in status 2 results in a second loop of sequences which will be more fully described with respect to status 11.

In status 11, as in status 2, when the transferring station goes on-hook or hookflashes a comparison is made between the ING number and the ING and ED numbers in memory in a search for the original trunk junctor. The presence of the CB PING signal indicates that the calling party is on-hook (block D94) and if a transfer class-of-service is detected (block D95) the system checks for a 2 second signal, which indicates that the party has actually gone on-hook (block D96). An OPS class-of-service for (block D97) and the presence of the transfer bit checked (block D99). If the transferring party has hookflashed, the flash signal is detected (block D98) and the transfer bit checked (block D99). A hold register search is initiated if the hold register is not busy (block D100) and a comparison made between the ING number and the ING and ED numbers (block D102). The OPS class-of-service again is checked (block D89) and if a status 11 is detected (block D90), the system generates a DAT O signal (data O) indicating that the local junctor should be released.

When the system detects the status 2 hold or the status 11 signals (block D76) the sequence along the lower loop in FIG. 7H. If a hookflash initiated the hold register search (block D84) and a 47 comparison of the trunk junctor occured (block D86), the system proceeds to a status 13 (block D88). The system also proceeds to status 13 is the trunk consultation class-of-service is detected (block D85) and a 14 comparison has occurred (block D87). However, if the status starting the hold register search was a 2 (block D77), there was no OPS class-of-service (block D78) and the calling party has gone on-hook (as indicated by the 2 second signal in block D79) starting the hold register search, and a 47 comparison has occurred in the trunk junctor (block D80), the system progresses to status 25 (block D83). From block D79, the system may also progress to status 25 by checking for the presence of the trunk consulation signal COS TT (block D81) and for the presence of a 14 COMP signal (block D82).

The preceding progressions of the system will now be more fully explained with reference to FIG. 8D. An AND gate 658 is enabled by the coincidence of the MTB signal and the transfer bit signal TB and transmits an output to one input of the gate 660. When the status signal DS02 (indicating status 2 and transmitted via a gate 656), the 2 second or the hookflash signals (transmitted via a gate 436) are present, the gate 660 is enabled by the hold register not busy signal HBSY (transmitted via gates 435 and 437). The output signals from the gate 660 then transmits the comparison signal COMP (ING ING+ED) to the register via gates 448 and 456.

When a comparison is made, the class-of-service OPS signal and the 2CB signal enable an AND gate 662 (FIG. 8C) which transmits an output signal via a gate 664 to one input of an AND gate 666. The 2CB signal is a combination of the CB PING signal and the 2SEC signal (see FIG. 8D). Alternatively, the one input of the AND gate 666 may be enabled by the signal FLASH transmitted via a gate 670. The gate 666 is enabled by the status signal DS11. An AND gate 668 then decodes the coincidence of these signals, along with the hold register busy signal HBSY, the class-of-service TRK signal and the transfer bit TB signal, is enabled and transmits the comparison signal COMP (I I+E). This comparison signal transmitted via gates 448 and 456 (FIG. 8D) produces the comparison signal COMP (ING ING+ED).

Once the comparison signal has been generated either in status 11 or in status 2, the data O signal is transmitted (via the gate 452 in FIG. 8D) to the local register. The output signal from the gate 452 is enabled during junctor time slots 14 and 15 by the output of gate 454 and the signal A DATO transmitted via the gate 451 and a DATA O signal. The A DATO signal is the output signal from an AND gate 672 which is enabled by the signals DS11 or DS2 (transmitted via the gate 674). The END SEARCH signal and the O12 signal (which is the transfer bit). For the other path the status 2 or status 11 signal S211-H and the 14-47 COMP signal enabled an AND gate which transmits an output to one input each of AND gates 676 and 688. The gate 676 is enabled by the two second Hold signal, 2SEC-H (transmitted via gate 680) and the output signal from the enabled gate 682. The gate 682 is enabled either by a class-of-service OPS signal COS OPS (transmitted via a gate 686) or by the indication that the hold register search was started in status 2, SO2-H (transmitted via a gate 684).

The output signal from the gate 676 is the signal AS25 which is transmitted via gates 690, 544, 546 and 548 (FIG. 8D) and produces a status 25, 26 signal S25-26 during junctor time slot 14. The gate 688 is enabled by the FLASH-H signal and transmits via gates 582 and 514 the status 13-16 signal.

While a preferred embodiment of the present invention has been illustrated, it will be apparent to those skilled in the art to which the invention pertains that various changes and modifications may be made without departing from the spirit and scope of the appended claims.

What is claimed is:

1. In a private automatic branch exchange having a solid state switching matrix for connecting local calling stations to local called stations and connecting local stations to incoming and outgoing trunk parties therethrough and a common control for effecting said connections by individual ones of a plurality of local and trunk junctors, having a memory associated with said local and trunk junctors, a trunk transfer circuit comprising:
   holding circuit means, responsive to a trunk transfer indication from a transferring local station connected to a trunk transfer party by one of said trunk junctors, for placing the trunk transfer party in a holding status;
   forwarding circuit means, responsive to said trunk transfer indication, for forwarding said transferring station to one of said local junctors while said transfer party is in said holding status;
   signaling circuit means, directed by said transferring station connected to said one local junctor for signaling a local transferee station of an impending trunk transfer; and
   first connecting circuit means, responsive to an answering signal by said local transferee station, for effecting a connection between said trunk transfer party and said transferee station.

2. A trunk transfer circuit as defined in claim 1 wherein said signaling means includes means for connecting said transferring station to said transferee station by the local junctor.

3. A trunk transfer circuit as defined in claim 2 wherein said first connecting circuit means includes means for effecting a three-way conference between said trunk transfer party, said transferring station and said transferee station.

4. A trunk transfer circuit as defined in claim 3 wherein said signaling circuit means includes reconnection circuit means, responsive to a signal recieved from said transferring station, for re-establishing the original trunk call.

5. A trunk transfer circuit as defined in claim 4 including first recall circuit means responsive to a busy signal received from said transferee station for recalling said transferring station.

6. A trunk transfer circuit as defined in claim 5 including second recall circuit means responsive to receipt of a signal indicating the absence of said answering signal from said transferee station for recalling the transferring station.

7. A trunk transfer circuit as defined in claim 6 including first diverting circuit means, responsive to receipt of a busy signal from said transferring station during the operation of said first recall circuit means, for diverting the trunk transfer party to a predetermined alternate station.

8. A trunk transfer circuit as defined in claim 7 including second diverting circuit means, responsive to receipt of a signal indicating the absence of an answer by said transferring station during the operation of said second recall circuit means, for diverting the trunk transfer party to another predetermined station.

9. A trunk transfer circuit as defined in claim 8 wherein both said first and second diverting means include means for diverting the trunk transfer party to an attendant position.

10. A private automatic branch exchange (PABX) having a solid state switching matrix with line appearances on one co-ordinate side of the matrix and junctor appearances on the other co-ordinate side of the matrix wherein the connection of line appearances for local calls occurs by the closing of an associated cross-point for each line appearance and for a local junctor and the connection of line appearances to trunks occurs by the closing of an associated crosspoint for each line appearance and for a trunk junctor, said exchange including a common control, time accessed by each junctor for effecting said connections by a progression of functional status indication wherein each junctor has a corresponding memory including storage for said status indications and the identities of the line appearances for the calling and called parties connected therethrough; said exchange being characterized by a trunk transfer circuit comprising:
   holding circuit means, responsive to a transfer indication from a transferring station of a line appearance connected to a trunk transfer party by one of said trunk junctors, for effecting the progression of the connecting junctor status from a trunk call in progress status to a transfer holding status;
   forwarding circuit means responsive to said transfer indication, for forwarding said transferring station to one of said local junctors while said trunk transfer party is in said transfer holding status;
   signaling circuit means, directed by said transferring station connected to said local junctor, for signaling a transferee station of an impending transfer; and
   connecting circuit means, responsive to an answering signal received from said transferee station, for effecting a connection between said trunk transfer party and said transferee station.

11. A PABX as defined in claim 10 wherein said forwarding circuit means includes:
   first means for directing the common control to search for a free local junctor;
   means for decoding from the common control that a local junctor is free;
   second means for directing the common control to seize said free local junctor;
   means for effecting the progress of said free local junctor from a free station to an initial off-hook status; and
   means for storing the identity of the transferring station into the junctor memory associated with said free local junctor.

12. A PABX as defined in claim 11 wherein said means for effecting an initial off-hook status includes means for storing a transfer function indication in said junctor memory associated with said free local junctor.

13. A PABX as defined in claim 12 wherein said means for storing includes first storing means for storing a station identity located in the called portion of said memory associated with said trunk junctor into the calling portion of said memory associated with local junctor in the absence of an indication of an outgoing trunk call.

14. A PABX as defined in claim 13 wherein said means for storing includes second storing means for storing the station identity located in the calling portion of said memory associated with said trunk junctor into the called portion of said memory associated with said local junctor is an indication of an outgoing trunk call is present.

* * * * *